(12) United States Patent
Matsui et al.

(10) Patent No.: US 7,690,582 B2
(45) Date of Patent: Apr. 6, 2010

(54) HUMIDITY CONTROLLER APPARATUS

(75) Inventors: Nobuki Matsui, Osaka (JP); Masanobu Kawazoe, Osaka (JP); Kazuo Yonemoto, Osaka (JP)

(73) Assignee: Daikin Industries, Ltd., Osaka-shi (JP)

( * ) Notice: Subject to any disclaimer, the term of this patent is extended or adjusted under 35 U.S.C. 154(b) by 1016 days.

(21) Appl. No.: 10/558,422

(22) PCT Filed: May 28, 2004

(86) PCT No.: PCT/JP2004/007807

§ 371 (c)(1),
(2), (4) Date: Nov. 29, 2005

(87) PCT Pub. No.: WO2004/106814

PCT Pub. Date: Dec. 9, 2004

(65) Prior Publication Data

US 2006/0260332 A1    Nov. 23, 2006

(30) Foreign Application Priority Data

May 30, 2003  (JP) .............................. 2003-154514

(51) Int. Cl.
*G05D 22/02* (2006.01)
(52) U.S. Cl. ................. 236/44 C; 62/94; 62/176.6; 62/271
(58) Field of Classification Search .............. 62/94, 62/271, 176.1, 176.6; 236/44 A, 44 C
See application file for complete search history.

(56) References Cited

U.S. PATENT DOCUMENTS 6,050,100 A * 4/2000 Belding et al. ................ 62/271

6,199,394 B1   3/2001 Maeda
2002/0040575 A1 * 4/2002 Okano et al. ............. 60/39.511

FOREIGN PATENT DOCUMENTS

JP       2001-182967 A      7/2001

(Continued)

*Primary Examiner*—Marc E Norman
(74) *Attorney, Agent, or Firm*—Birch, Stewart, Kolasch & Birch, LLP.

(57) ABSTRACT

A humidity controller apparatus (20) contains an adsorption rotor (24) and a heater (25). A first passage (21) along which a first air stream flows and a second passage (22) along which a second air stream flows are formed in the humidity controller apparatus (20). The amount of heat exchange between the first and second air streams and the amount of moisture exchange between the first and second air streams vary by adjustment to the rotating speed of the adsorption rotor (24), and the humidity controller apparatus (20) is switched between a dehumidification operation and a humidification/heating operation. During the dehumidification operation, the rotating speed of the adsorption rotor (24) is set low. The first air stream is dehumidified by the adsorption rotor (24) and then supplied to the inside of a room. The second air stream is used for regeneration of the adsorption rotor (24) and then discharged to the outside of the room. During the humidification/heating operation, the rotating speed of the adsorption rotor (24) is set high. The first air stream receives heat and moisture from the adsorption rotor (24) and then is supplied to the inside of the room. The second air stream is heat/moisture-adsorbed by the adsorption rotor (24) and then discharged to the outside of the room.

16 Claims, 9 Drawing Sheets

FOREIGN PATENT DOCUMENTS

| | | |
|---|---|---|
| JP | 2001-193965 A | 7/2001 |
| JP | 2001-263727 A | 9/2001 |
| JP | 2002-130737 A | 5/2002 |
| JP | 2002-130738 A | 5/2002 |
| JP | 2002-317964 A | 10/2002 |
| JP | 2002-349905 A | 12/2002 |
| JP | 2003-38929 A | 2/2003 |
| JP | 2003-42006 A | 2/2003 |
| JP | 2003-74906 A | 3/2003 |

* cited by examiner

HUMIDITY CONTROLLER APPARATUS

TECHNICAL FIELD

The present invention relates to a humidity controller apparatus for providing room dehumidification or humidification.

BACKGROUND ART

Humidity controller apparatuses of the type which provide room dehumidification or humidification by making utilization of an adsorbent are known in the prior art. One such humidity controller apparatus is disclosed in for example JP Patent Application Publication (Kokai) No. 2002-349905. This humidity controller apparatus includes two air passages and a dehumidifier with an adsorbent. The dehumidifier is disposed, such that it extends over both the air passages. In addition, in the humidity controller apparatus, a first switching valve is disposed on the entrance side of the air passages while, on the other hand, a second switching valve is disposed on the exit side of the air passages. By operation of the first switching valve, the air passages, into which room air and outside air are introduced, are switched. By operation of the second switching valve, an air stream after passage through each air passage is switchably guided to the inside or to the outside of a room.

During a dehumidification operation of the humidity controller apparatus, outside air taken into one of the air passages is dehumidified by the dehumidifier. Then, the dehumidified outside air is supplied to the inside of the room. Room air taken into the other air passage is used for regeneration of the dehumidifier. Then, the room air is discharged to the outside of the room. On the other hand, during a humidification operation of the humidity controller apparatus, room air taken into the one air passage is dehumidified by the dehumidifier. Then, the dehumidified room air is discharged to the outside of the room. Outside air taken into the other passage is humidified by moisture desorbed from the dehumidifier. Then, the humidified outside air is supplied to the inside of the room. As described above, the air passages are switched by the two switching valves in the humidity controller apparatus, for providing room dehumidification and humidification.

In addition, humidity controller apparatuses of the type which make utilization of the exhaust gas of a gas-turbine engine electric power generator are known in the art. One such humidity controller apparatus is disclosed in JP Patent Application Publication (Kokai) No. 2003-42006. This humidity controller apparatus is provided with a passage for the supply of air along which outside air flows and a passage for the discharge of air along which room air flows. The humidity controller apparatus further includes two flow paths along which the exhaust gas flows. In addition, the humidity controller apparatus is provided with a switching damper for selectively switchably introducing the exhaust gas into either one of the flow paths.

During the dehumidification operation, the exhaust gas is introduced, through one of the flow paths, into the regeneration side of a dehumidification rotor. The exhaust gas is used to regenerate the dehumidification rotor and then discharged to the outside of the room. Outside air taken into the air supply passage is dehumidified in the adsorption side of the dehumidification rotor, is cooled as a result of heat exchange with the room air in a sensible heat exchanger, and then is supplied into the inside of the room. On the other hand, during the heating operation, the exhaust gas is introduced, through the other flow path, into the upstream side of the sensible heat exchanger in the air exhaust passage. Room air taken into the air exhaust passage is heated as a result of being mixed with the exhaust gas and then introduced into the sensible heat exchanger. Outside air taken into the air supply passage passes through the dehumidification rotor at rest, is heated as a result of heat exchange with the room air in the sensible heat exchanger, and then is supplied into the inside of the room. In the way as described above, switching of the flow path along which the exhaust gas flows is made by the switching damper, whereby room dehumidification and room humidification are provided.

PROBLEMS THAT INVENTION INTENDS TO SOLVE

The aforesaid JP Patent Application Publication (Kokai) No. 2002-349905 makes it possible for a single humidity controller apparatus to selectively switch between a room dehumidification operation and a room humidification operation. However, this humidity controller apparatus requires the provision of two switching valves for switching between the room dehumidification operation and the room humidification operation, which produces the problem that the humidity controller apparatus becomes complicated in structure and the costs increase.

On the other hand, the operation of the humidity controller apparatus disclosed in JP Patent Application Publication (Kokai) No. 2003-42006 is switched by just operating the switching damper capable of switching of the passage along which the exhaust gas flows, thereby making its structure simpler than that of the humidity controller apparatus of JP Patent Application Publication (Kokai) No. 2002-349905. However, the problem with this humidity controller apparatus is that it provides only air dehumidification and heating, in other words air humidification is unavailable. Besides, since the exhaust gas is hot, this causes another problem with the switching damper for switching of the flow of the exhaust gas, in other words it becomes difficult to secure the reliability of the switching damper.

With the above-described problems in mind, the present invention was made. Accordingly, an object of the present invention is to provide a humidity controller apparatus which provides dehumidification and humidification without the use of switching valves, which has a simple structure, and which is highly reliable.

DISCLOSURE OF INVENTION

A first invention is provided which is directed to a humidity controller apparatus which is selectively switchable between a dehumidification operation for dehumidifying a supply of air to a room, and a humidification/heating operation for humidifying and heating a supply of air to the room. And, the humidity controller apparatus of the first invention comprises: a first passage (21) along which a first air stream flows towards the inside of the room; a second passage (22) along which a second air stream flows towards the outside of the room; a humidity control part (23), provided with an adsorbent which is contactable with the first and second air streams, for causing heat exchange and moisture exchange between the first and second air streams, the humidity control part (23) being configured such that the amount of heat exchange between the first and second air streams and the amount of moisture exchange between the first and second air streams are adjustable; and a heating means (25) for heating the second air stream which is sent to the humidity control part (23). In the humidity controller apparatus of the first invention, switching between the dehumidification operation and the humidification/heating operation is made by adjustment to the amount of heat exchange and the amount of moisture exchange in the humidity control part (23).

A second invention according to the first invention is provided in which: the humidity control part (23), provided with a rotationally-driven adsorption rotor (24) which has a surface on which is supported an adsorbent and which is disposed so as to extend over both the first passage (21) and the second passage (22), is configured such that the amount of heat exchange and the amount of moisture exchange are adjusted by making changes in the rotational speed of the adsorption rotor (24); and the rotational speed of the adsorption rotor (24) during the humidification/heading operation is set higher than that during the dehumidification operation.

A third invention according to the second invention is provided in which the heating means (25) heats the second air stream to form a temperature distribution therein so that, in the adsorption rotor (24) extending across the second passage (22), a terminal end portion of the adsorption rotor (24) in the rotating direction of the adsorption rotor (24) comes into contact with a part of the second air stream having a higher temperature than a part of the second air stream which a leading end portion of the adsorption rotor (24) comes into contact with.

A fourth invention according to the first invention is provided in which the humidity controller apparatus comprises a sensible heat exchanger for effecting heat exchange between the first air stream after passage through the humidity control part (23) and the second air stream before subjected to heating by the heating means (25).

A fifth invention according to the fourth invention is provided in which: a rotating rotor (26) which is rotationally driven is provided as a sensible heat exchanger; the rotating rotor (26) being so disposed as to extend over both the first passage (21) and the second passage (22); and the rotating rotor (26) absorbing heat from either one of the first and second air streams and then giving off the heat to the other of the first and second air streams.

A sixth invention according to the fourth invention is provided in which a heat exchange member (27), in which flow paths for the first air stream and flow paths for the second air stream are alternately formed in a large number for mutual heat exchange between the first and second streams flowing through the respective flow paths, is provided as a sensible heat exchanger.

A seventh invention according to the fifth invention is provided in which the rotating rotor (26) is rotationally driven during the dehumidification operation but is stopped during the humidification/heating operation.

An eighth invention according to any one of the fourth to sixth inventions is provided in which an exhaust passage (30), for discharge of a portion of the second air stream after passage through the sensible heat exchanger but before subjected to heating by the heating means (25), is connected to the second passage (22).

A ninth invention according the first invention is provided in which the heating means (25) is so configured as to heat the second air stream by mixing into the second air stream a heating gas higher in temperature and absolute humidity than the second air stream.

A tenth invention according to the ninth invention is provided in which the heating means (25) mixes into the second air stream an exhaust gas emitted from an electric power generator (40) as a heating gas.

An eleventh invention is provided which is directed to a humidity controller apparatus which is selectively switchable between a dehumidification/cooling operation for dehumidifying and cooling a supply of air to a room, and a humidification operation for humidifying a supply of air to the room. The humidity controller apparatus of the eleventh invention comprises: a first passage (21) along which a first air stream flows towards the outside of the room; a second passage (22) along which a second air stream flows towards the inside of the room; a humidity control part (23), provided with an adsorbent which is contactable with the first and second air streams, for causing heat exchange and moisture exchange between the first and second air streams, the humidity control part (23) being configured such that the amount of heat exchange between the first and second air streams and the amount of moisture exchange between the first and second air streams are adjustable; and a heating means (25) which heats the second air stream which is sent to the humidity control part (23) during the humidification operation, and which stops heating the second air stream during the dehumidification/cooling operation. In the humidity controller apparatus of the eleventh invention, switching between the dehumidification/cooling operation and the humidification operation is made by adjustment to the amount of heat exchange and the amount of moisture exchange in the humidity control part (23).

A twelfth invention according to the eleventh invention is provided in which: the humidity control part (23), provided with a rotationally-driven adsorption rotor (24) which has a surface on which is supported an adsorbent and which is disposed so as to extend over both the first passage (21) and the second passage (22), is configured such that the amount of heat exchange and the amount of moisture exchange are adjusted by making changes in the rotational speed of the adsorption rotor (24); and the rotational speed of the adsorption rotor (24) during the dehumidification/cooling operation is set higher than that during the humidification operation.

A thirteenth invention according to the twelfth invention is provided in which the heating means (25) heats the second air stream to form a temperature distribution therein so that, in the adsorption rotor (24) extending across the second passage (22), a terminal end portion of the adsorption rotor (24) in the rotating direction of the adsorption rotor (24) comes into contact with a part of the second air stream having a higher temperature than a part of the second air stream which a leading end portion of the adsorption rotor (24) comes into contact with.

A fourteenth invention according to the eleventh invention is provided in which the humidity controller apparatus comprises a sensible heat exchanger for effecting heat exchange between the first air stream after passage through the humidity control part (23) and the second air stream before subjected to heating by the heating means (25).

A fifteenth invention according to the fourteenth invention is provided in which: a rotating rotor (26) which is rotationally driven is provided as a sensible heat exchanger; the rotating rotor (26) being so disposed as to extend over both the first passage (21) and the second passage (22); and the rotating rotor (26) absorbing heat from either one of the first and second air streams and then giving off the heat to the other of the first and second air streams.

A sixteenth invention according to the fourteenth invention is provided in which a heat exchange member (27), in which flow paths for the first air stream and flow paths for the second air stream are alternately formed in a large number for mutual heat exchange between the first and second streams flowing through the respective flow paths, is provided as a sensible heat exchanger.

A seventeenth invention according to any of the fourteenth to sixteenth inventions is provided in which the heating means

(25) is so configured as to heat the second air stream by heat exchange, in the sensible heat exchanger, between the first air stream heated by mixing-in of a heating gas having a higher temperature than the second air stream and the second air stream.

Finally, an eighteenth invention according to the seventeenth invention is provided in which the heating means (25) mixes into the first air stream an exhaust gas emitted from an electric power generator (40) as a heating gas.

Working Operation

In the first invention, the humidity controller apparatus (20) switches between a dehumidification operation for dehumidifying a supply of air to a room and a humidification/heating operation for humidifying and heating a supply of air to the room. Switching between the dehumidification operation and the humidification/heating operation is made by adjustment to the amount of heat exchange between the first and second air streams and the amount of moisture exchange between the first and second air streams in the humidity control part (23).

During the dehumidification operation, the amount of heat exchange and the amount of moisture exchange in the humidity control part (23) are set so that the first air stream is dehumidified in the humidity control part (23). In the humidity control part (23), moisture present in the first air stream is adsorbed on the adsorbent. Then, the dehumidified first air stream is supplied to the inside of the room. In addition, the adsorbent is heated by the high-temperature second air stream in the humidity control part (23), and the adsorbent is regenerated.

On the other hand, during the humidification/heating operation, the amount of heat exchange and the amount of moisture exchange in the humidity control part (23) are set so that the first air stream is heated and humidified in the humidity control part (23). In the humidity control part (23), the second air stream heated by the heating means (25) exchanges heat with the first air stream. As a result, the first air stream is heated. In addition, in the humidity control part (23), moisture present in the second air stream travels, through the adsorbent, to the first air stream. As a result, the first air stream is also humidified.

In the second invention, the amount of heat exchange between the first and second air streams and the amount of moisture exchange between the first and second air streams are controlled by varying the rotating speed of the adsorption rotor (24).

During the dehumidification operation, the rotating speed of the adsorption rotor (24) is set at a predetermined value. In a portion of the adsorption rotor (24) that extends across the second passage (22), the adsorbent is heated by the second air stream and as a result is regenerated. The desorbed moisture is given to the second air stream. In the portion of the adsorption rotor (24) which has changed position to the first passage (21) from the second passage (22), moisture present in the first air stream is adsorbed on the adsorbent. In this way, between the first and second air streams introduced into the humidity control part (23), moisture exchange through the adsorbent of the adsorption rotor (24) mainly takes place.

On the other hand, the rotating speed of the adsorption rotor (24) during the humidification/heating operation is set higher than that during the dehumidification operation. A portion of the adsorption rotor (24) that extends across the second passage (22) comes into contact with the second air stream heated by the heating means (25), and is heated by the second air stream. At that time, some of the moisture present in the second air stream is adsorbed on the adsorbent of the adsorption rotor (24). The portion of the adsorption rotor (24) that has changed position to the first passage (21) from the second passage (22) comes into contact with the first air stream. The rotating speed of the adsorption rotor (24) is fast during the humidification/heating operation, so that, when focusing attention on a specific portion of the adsorption rotor (24), the time required for that specific portion to pass through the first passage (21) is short. As the result of this, the portion of the adsorption rotor (24) extending across the first passage (21) enters such a state that its temperature is held relatively high.

Accordingly, in the first passage (21), the difference in temperature between the adsorption rotor (24) and the first air stream widens and as a result the amount of heat applied to the first air stream from the adsorption rotor (24) increases. In addition, at that time, some amount of moisture is desorbed from the adsorbent of the adsorption rotor (24) and given to the first air stream. In this way, between the first and second air streams introduced into the humidity control part (23), heat exchange and moisture exchange through the adsorption rotor (24) take place.

In the third invention, the second air stream with formation of a temperature distribution is supplied to the humidity control part (23). Here, when focusing attention on a specific portion of the adsorption rotor (24) which has changed position to the second passage (22), the temperature of that specific portion becomes higher during movement through the second passage (22). Therefore, in the third invention, for the adsorption rotor (24) which extends across the second passage (22), a portion thereof positioned nearer to the terminal end in the rotating direction of the adsorption rotor (24) is supplied with the second air stream having a higher temperature. In other words, the second air stream having a relatively low temperature is supplied to a portion of the adsorption rotor (24) which has just moved to the second passage (22) while on the other hand the second air stream having a relatively high temperature is supplied to a portion of the adsorption rotor (24) which has risen in temperature because of being in contact with the second air stream for a long period of time.

In the fourth invention, in the sensible heat exchanger, heat exchange takes place between the first air stream and the second air stream.

In the fifth invention, the rotating rotor (26) constitutes a sensible heat exchanger. For example, when causing heat to move to the second air stream from the first air stream, a portion of the rotating rotor (26) extending across the first passage (21) is heated by the first air stream. The portion of the rotating rotor (26) which has absorbed the heat from the first air stream moves to the second passage (22). And, the portion of the rotating rotor (26) which has changed position to the second passage (22) gives off the heat to the second air stream. In this way, between the first air stream and the second air stream, heat exchange takes place through the rotating rotor (26).

In the sixth invention, the heat exchange member (27) constitutes a sensible heat exchanger. Flow paths for the first air stream and flow paths for the second air stream are alternately formed in the heat exchange member (27). And, in the heat exchange member (27), heat exchange takes place between the first air stream and the second air stream while the first and second air streams pass through their respective flow paths.

In the seventh invention, the rotating rotor (26) is rotationally driven during the dehumidification operation, and heat exchange takes place, through the rotating rotor (26), between the first air stream and the second air stream. On the other hand, during the humidification/heating operation, the rotating rotor (26) is placed in the stopped state. Stated another way, during the humidification/heating operation, the first and second air streams flow through the rotating rotor (26) at rest. Consequently, no heat exchange takes place between the first air stream and the second air stream.

In the eighth invention, the exhaust passage (30) is connected to the second passage (22). A portion of the second air stream after passage through the sensible heat exchanger is discharged out of the exhaust passage (30). As a result, the flow rate of the second air stream which is heated by the heating means (25) decreases and the temperature of the second air stream after heating rises. Consequently, the second air stream of higher temperature is supplied to the humidity control part (23), and the amount of moisture desorbing from the adsorbent increases.

In the ninth invention, the heating means (25) mixes a heating gas into the second air stream. Thereby, heat and moisture in the heating gas are given to the second air stream and as a result the second air stream increases in temperature and absolute humidity. In the humidity control part (23), the amount of heat exchange and the amount of moisture exchange increase proportionally to the amount of heat and the amount of moisture given to the second air stream from the heating gas.

In the tenth invention, the exhaust gas of the electric power generator (40) is used as a heating gas. In other words, the exhaust gas of the electric power generator (40) is utilized to operate the humidity controller apparatus (20).

In the eleventh invention, the humidity controller apparatus (20) switches between a dehumidification/cooling operation for dehumidifying and cooling a supply of air to a room, and a humidification for humidifying a supply of air to the room. Switching between the dehumidification/cooling operation and the humidification operation is made by adjustment to the amount of heat exchange between the first and second air streams and the amount of moisture exchange between the first and second air streams in the humidity control part (23).

During the dehumidification/cooling operation, the amount of heat exchange and the amount of moisture exchange in the humidity control part (23) are set so that the second air stream is subjected to dehumidification and cooling in the humidity control part (23). Heating of the second air stream by the heating means (25) is stopped, and the second air stream without application of heat is supplied to the humidity control part (23). In the humidity control part (23), the second air stream exchanges heat with the first air stream. As a result, the second air stream is cooled. In addition, in the humidity control part (23), moisture present in the second air stream moves to the first air stream through the adsorbent, and dehumidification of the second air stream also takes place.

On the other hand, during the humidification operation, the amount of heat exchange and the amount of moisture exchange in the humidity control part (23) are set so that the second air stream is subjected to humidification in the humidity control part (23). In the humidity control part (23), the adsorbent is regenerated by the second air stream heated by the heating means (25), and moisture desorbed from the adsorbent is given to the second air stream, in other words the second air is humidified. In addition, in the humidity control part (23), the first air stream comes to contact with the adsorbent and as a result moisture present in the first air stream is adsorbed on the adsorbent.

In the twelfth invention, the amount of heat exchange between the first and second air streams and the amount of moisture exchange between the first and second air streams are adjusted by varying the rotating speed of the adsorption rotor (24).

During the humidification operation, the rotating speed of the adsorption rotor (24) is set at a predetermined value. In a portion of the adsorption rotor (24) that extends across the second passage (22), the adsorbent is heated by the second air stream and as a result is regenerated. The desorbed moisture is given to the second air stream. In the portion of the adsorption rotor (24) which has changed position to the first passage (21) from the second passage (22), moisture present in the first air stream is adsorbed on the adsorbent. In this way, between the first and second air streams introduced into the humidity control part (23), moisture exchange through the adsorbent of the adsorption rotor (24) mainly takes place.

On the other hand, the rotating speed of the adsorption rotor (24) during the dehumidification/cooling operation is set higher than that during the humidification operation. A portion of the adsorption rotor (24) extending across the second passage (22) comes to contact with the second air stream and absorbs heat from the second air stream. At that time, some of the moisture present in the second air stream is adsorbed on the adsorbent of the adsorption rotor (24). The portion of the adsorption rotor (24) that has changed position to the first passage (21) from the second passage (22) comes into contact with the first air stream. The rotating speed of the adsorption rotor (24) is fast during the dehumidification/cooling operation, and when focusing attention on a specific portion of the adsorption rotor (24), the time required for that specific portion to pass through the first passage (21) is short. As the result of this, the portion of the adsorption rotor (24) extending across the first passage (21) enters such a state that its temperature is held relatively high.

Accordingly, in the first passage (21), the difference in temperature between the adsorption rotor (24) and the first air stream widens and as a result the amount of heat which is applied to the first air stream from the adsorption rotor (24) increases. In addition, at that time, some amount of moisture is desorbed from the adsorbent of the adsorption rotor (24). Then, the desorbed moisture is given to the first air stream. In this way, between the first and second air streams introduced into the humidity control part (23), heat exchange and moisture exchange take place through the adsorption rotor (24).

In the thirteenth invention, the second air stream with formation of a temperature distribution is supplied to the humidity control part (23). Here, when focusing attention on a specific portion of the adsorption rotor (24) which has changed position to the second passage (22), the temperature of that specific portion becomes higher during movement through the second passage (22). Therefore, in the third invention, for the adsorption rotor (24) which extends across the second passage (22), a portion thereof positioned nearer to the terminal end in the rotating direction of the adsorption rotor (24) is supplied with the second air stream having a higher temperature. In other words, the second air stream having a relatively low temperature is supplied to a portion of the adsorption rotor (24) which has just moved to the second passage (22) while on the other hand the second air stream having a relatively high temperature is supplied to a portion of the adsorption rotor (24) which has risen in temperature because of being in contact with the second air stream for a long period of time.

In the fourteenth invention, in the sensible heat exchanger, heat exchange takes place between the first air stream and the second air stream.

In the fifteenth invention, the rotating rotor (26) constitutes a sensible heat exchanger. For example, when causing heat to move to the second air stream from the first air stream, a portion of the rotating rotor (26) extending across the first passage (21) is heated by the first air stream. The portion of the rotating rotor (26) which has absorbed the heat from the first air stream moves to the second passage (22). And, the portion of the rotating rotor (26) which has changed position to the second passage (22) gives off the heat to the second air stream. In this way, between the first air stream and the second air stream, heat exchange takes place through the rotating rotor (26).

In the sixteenth invention, the heat exchange member (27) constitutes a sensible heat exchanger. Flow paths for the first air stream and flow paths for the second air stream are alternately formed in the heat exchange member (27). And, in the heat exchange member (27), heat exchange takes place between the first air stream and the second air stream while the first and second air streams pass through their respective flow paths.

In the seventeenth invention, the heating means (25) mixes a heating gas into the first air stream. The sensible heat exchanger is supplied with the first air stream heated by mixing-in of the heating gas. In the sensible heat exchanger, the first air stream exchanges heat with the second air stream and as a result the second air stream is heated. The second air stream thus heated flows into the humidity control part (23). In the humidity control part (23), the amount of heat exchange increases proportionally to the amount of heat given to the second air stream from the heating gas.

In the eighteenth invention, the exhaust gas of the electric power generator (40) is used as a heating gas. In other words, the exhaust gas of the electric power generator (40) is utilized to operate the humidity controller apparatus (20).

Effects

In the first invention, switching between the dehumidification operation and the humidification/heating operation is made by adjustment to the amount of heat exchange and the amount of moisture exchange in the humidity control part (23). This makes it possible for the apparatus to switch between the dehumidification operation and the humidification/heating operation without switching the distribution route of the first and second air streams. Therefore, the first invention provides a humidity controller apparatus which is able to switch between the dehumidification operation and the humidification/heating operation, which is simple in configuration, and which is highly reliable.

In accordance with the second invention, the amount of heat exchange and the amount of moisture exchange are reliably adjusted by varying the rotating speed of the adsorption rotor (24) disposed in the humidity control part (23).

In the third invention, the heating means (25) forms a temperature distribution in the second air stream so that a portion of the adsorption rotor (24) having a higher temperature comes to contact with the second air stream having a higher temperature. As a result of such arrangement, it becomes possible to make the difference in temperature between the adsorption rotor (24) and the second air stream which heats the adsorption rotor (24) approximately constant, thereby making it possible to efficiently perform heating of the adsorption rotor (24). Therefore, in accordance with the third invention, the amount of heating necessary for regeneration of the adsorption rotor (24) is reduced.

In each of the fourth, fifth, and sixth inventions, it is arranged that heat exchange between the first and second air streams takes place in the sensible heat exchanger. As a result of such arrangement, during the dehumidification operation, the first air stream which is supplied to the inside of the room is cooled by the sensible heat exchanger. Further, at that time, the heat held in the first air stream is collected in the second air stream, thereby making it possible to reduce the amount of heating to the second air stream in the heating means (25). Therefore, in accordance with these inventions, the running cost of the humidity controller apparatus (20) is cut down.

In the ninth and tenth inventions, the heating means (25) mixes the exhaust gas of the electric power generator (40) into the second air stream. As a result, the second air stream flowing into the humidity control part (23) increases in temperature and absolute humidity. This makes it possible to increase the amount of heat exchange and the amount of moisture exchange in the humidity control part (23). Consequently, the first air stream of further higher temperature and absolute humidity is supplied into the room during the humidification/heating operation.

In the eleventh invention, switching between the dehumidification/cooling operation and the humidification operation is made by adjustment to the amount of heat exchange and the amount of moisture exchange in the humidity control part (23). This makes it possible for the apparatus to switch between the dehumidification/cooling operation and the humidification operation without switching the distribution route of the first and second air streams. Therefore, the eleventh invention provides a humidity controller apparatus which is able to switch between the dehumidification/cooling operation and the humidification operation, which is simple in configuration, and which is highly reliable.

In accordance with the twelfth invention, the amount of heat exchange and the amount of moisture exchange are reliably adjusted by varying the rotating speed of the, adsorption rotor (24) disposed in the humidity control part (23).

In the thirteenth invention, the heating means (25) forms a temperature distribution in the second air stream so that a portion of the adsorption rotor (24) having a higher temperature comes to contact with the second air stream having a higher temperature. As a result of such arrangement, it becomes possible to make the difference in temperature between the adsorption rotor (24) and the second air stream which heats the adsorption rotor (24) approximately constant, thereby making it possible to efficiently perform heating of the adsorption rotor (24). Therefore, in accordance with the thirteenth invention, the amount of heating necessary for regeneration of the adsorption rotor (24) is reduced.

In each of the fourteenth, fifteenth, and sixteenth inventions, it is arranged that heat exchange between the first and second air streams takes place in the sensible heat exchanger. As a result of such arrangement, the second air stream which is supplied to the inside of the room is cooled in the sensible heat exchanger during the dehumidification/cooling operation. In addition, during the humidification operation, heat held in the first air stream is collected in the second air stream, therefore making it possible to reduce the amount of heating to the second air stream in the heating means (25). Therefore, in accordance with these inventions, the running cost of the humidity controller apparatus is cut down.

In the seventeenth and eighteenth inventions, the heating means (25) mixes the exhaust gas of the electric power generator (40) into the first air stream. As a result, the second air stream flowing into the humidity control part (23) through the sensible heat exchanger rises in temperature. This makes it possible to increase the amount of heat exchange in the humidity control part (23). Consequently, it becomes possible to supply the second air stream of further higher temperature to the inside of the room during the humidification operation.

BEST MODE FOR CARRYING OUT INVENTION

Figure 1:
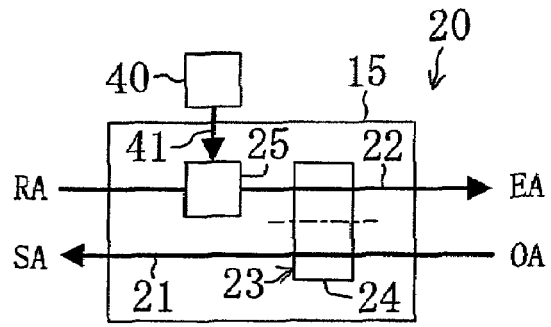
FIG. 1 is a schematic showing the arrangement of a humidity controller apparatus of a first embodiment of the present invention.

Hereinafter, embodiments of the present invention will be described with reference to the drawing figures.

Embodiment 1 of Invention

As shown in FIG. 1, a humidity controller apparatus (20) of the first embodiment comprises a casing (15). The casing (15) contains a humidity control part (23) and a heater (25) as a heating means. The inside of the casing (15) is so divided as to form a first passage (21) and a second passage (22). The leading end of the first passage (21) is connected to the outside of a room while the terminal end thereof is connected to the inside of the room. In addition, the leading end of the second passage (22) is connected to the inside of the room while the terminal end thereof is connected to the outside of the room. The first and second passages (21) and (22) are each provided with a respective fan (not shown). When these fans are operated, outside air (OA) as a first air stream flows in the first passage (21) and room air (RA) as a second air stream flows in the second passage (22).

The humidity control part (23) has an adsorption rotor (24). The adsorption rotor (24) is shaped like a disc-like, honeycomb-like shape, thereby allowing the passage of air therethrough in the thickness direction. An inorganic material consisting mainly of zeolite, Type A silica gel or the like is applied, as an adsorbent, on the surface of the adsorption rotor (24). The adsorption rotor (24) is oriented, such that it extends across the first and second passages (21) and (22). In a portion of the adsorption rotor (24) that extends across the first passage (21), the adsorbent comes into contact with the first air stream. On the other hand, in a portion of the adsorption rotor (24) that extends across the second passage (22), the adsorbent comes into contact with the second air stream. In addition, the adsorption rotor (24) is rotationally driven by a motor (not shown).

The adsorption rotor (24) is configured, such that its rotating speed is adjustable. By adjustment to the rotational speed of the adsorption rotor (24), its capability to exchange heat and moisture between the first and second air streams is varied. In other words, as the rotating speed of the adsorption rotor (24) varies, the amount of heat exchange between the first and second air streams and the amount of moisture exchange between the first and second air streams are controlled. The humidity controller apparatus (20) of the present embodiment switches between the dehumidification operation and the humidification/heating operation by varying the rotating speed of the adsorption rotor (24).

The heater (25) is disposed upstream of the humidity control part (23) in the second passage (22). The heater (25) is provided to heat the second air stream. In addition, connected to the heater (25) is an exhaust gas pipe (41) of a co-generation system (40) which is an electric power generator.

The co-generation system (40) has a solid-electrolyte fuel cell. This fuel cell causes a cell reaction in which the fuel is hydrogen contained in a reformed gas generated from carbon hydride such as methane and the oxidant is oxygen present in the air, and outputs electric power produced by the cell reaction. The fuel reaction in the fuel cell generates a high-temperature exhaust gas. The exhaust gas is sent to the exhaust gas pipe (41). In the heater (25), heat exchange takes place between the second air stream and the exhaust gas. At this time, in the heater (25), the second air stream is heated such that a predetermined temperature distribution is formed in the second air stream after heating.

As described above, by adjustment to the rotational speed of the adsorption rotor (24), the capability to exchange heat between the first and second air streams and the capability to exchange moisture between the first and second air streams are varied. This is described below.

When the rotating speed of the adsorption rotor (24) is slow, the time that the portion of the adsorption rotor (24) extending across the second passage (22) is in contact with the second air stream becomes longer than when the rotating speed of the adsorption rotor (24) is fast. During the passage through the second passage (22), the adsorption rotor (24) is heated by the second air stream. Moisture is desorbed from the adsorbent by the heated second air stream. The desorbed moisture is given to the second air stream. After passing through the second passage (22), the adsorption rotor (24) moves to the first passage (21).

In addition, when the rotating speed of the adsorption rotor (24) is slow, the time taken for the portion of the adsorption rotor (24) which has changed position to the first passage (21) from the second passage (22) to pass through the first passage (21) becomes longer. As a result, the portion of the adsorption rotor (24) extending across the first passage (21) once falls in temperature due to contact with the first air stream. Thereafter, moisture present in the first air stream is absorbed on the adsorbent disposed in that portion. The portion of the adsorption rotor (24) which has adsorbed the moisture when passing through the first passage (21) again moves to the second passage (22).

As described above, when the rotating speed of the adsorption rotor (24) is set slow, moisture exchange through the adsorbent of the adsorption rotor (24) mainly takes place between the first and second air streams introduced into the humidity control part (23), whereby the first air stream is dehumidified.

On the other hand, when the rotating speed of the adsorption rotor (24) is fast, the time that the portion of the adsorption rotor (24) extending across the second passage (22) is in contact with the second air stream becomes shorter than when the rotating speed of the adsorption rotor (24) is slow. During the passage through the second passage (22), the adsorption rotor (24) is heated by the second air stream. In addition, if the absolute humidity of the second air stream is at a certain high level, some of the moisture present in the second air stream is adsorbed on the adsorbent of the adsorption rotor (24). After the passage through the second passage (22), the adsorption rotor (24) moves to the first passage (21).

When the rotating speed of the adsorption rotor (24) is fast, the time required for the portion of the adsorption rotor (24) which has changed position to the first passage (21) from the second passage (22) to pass through the first passage (21) becomes shorter. Consequently, the portion of the adsorption rotor (24) which has moved to the first passage (21) moves to the second passage (22) from the first passage (21) before its temperature drops so much. In other words, the portion of the adsorption rotor (24) that extends across the first passage (21) enters such a state that its temperature is held relatively high. Accordingly, in the first passage (21), the difference in temperature between the adsorption rotor (24) and the first air stream widens, thereby increasing the amount of heat which is applied to the first air stream. In addition, if the absolute humidity of the first air stream is at a certain low level, some moisture is desorbed from the adsorbent of the adsorption rotor (24). The desorbed moisture is given to the first air stream.

As described above, when the rotating speed of the adsorption rotor (24) is set fast, heat exchange and moisture exchange through the adsorption rotor (24) take place between the first and second air streams introduced into the humidity control part (23), whereby the first air stream is heated and humidified.

Running Operation

The running operation of the humidity controller apparatus (20) is described below.

Figure 2:
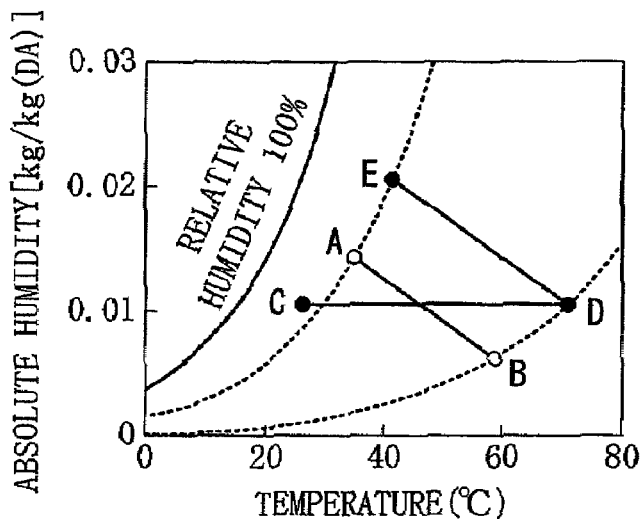
FIG. 2 is a psychrometric chart representing a dehumidification operation of the humidity controller apparatus of the first embodiment.

In the first place, a dehumidification operation of the humidity controller apparatus (20) is described with reference to FIG. 2. When performing the dehumidification operation, the rotating speed of the adsorption rotor (24) is set at 0.5 rpm. A first air stream in a state of Point A is fed into the first passage (21) of the humidity controller apparatus (20). Then, the first air stream is sent to the adsorption rotor (24). In the adsorption rotor (24), moisture present in the first air stream is adsorbed on the adsorbent. Thereby, the first air stream varies along an isenthalpic curve. The first air stream decreases in absolute humidity but increases in temperature, thereby entering a state of Point B. The first air stream in the state of Point B is supplied, as supply air (SA), into the inside of a room.

On the other hand, a second air stream in a state of Point C is fed into the second passage (22) of the humidity controller apparatus (20). The second air stream is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point D.

The second air stream in the state of Point D is sent to the adsorption rotor (24). In the adsorption rotor (24), the second air stream comes into contact with the adsorbent. On the other hand, since the adsorption rotor (24) is rotating, a portion of the adsorption rotor (24) that has absorbed moisture from the first air stream eventually moves to the second passage (22) and comes into contact with the second air stream. By contact with the second air stream, moisture is desorbed from the adsorbent of the adsorption rotor (24) and as a result the adsorbent is regenerated. Thereby, the second air stream varies along an isenthalpic curve. The second air stream increases in absolute humidity but decreases in temperature, thereby entering a state of Point E. The second air stream in the state of Point E is discharged, as exhaust air (EA), to the outside of the room.

Figure 3:
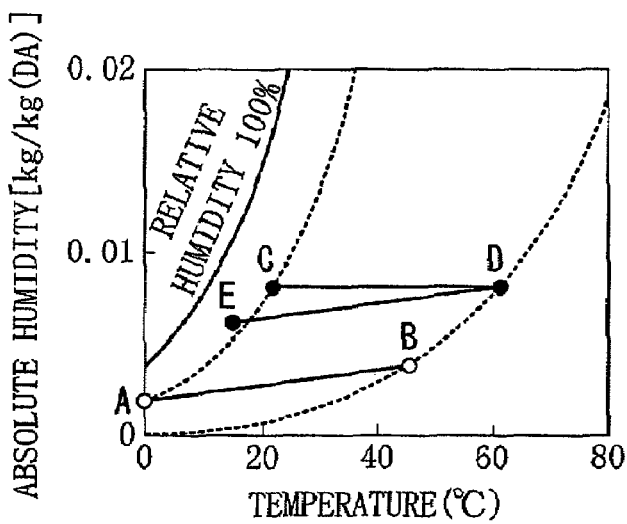
FIG. 3 is a psychrometric chart representing a humidification/heating operation of the humidity controller apparatus of the first embodiment.

Next, a humidification/heating operation of the humidity controller apparatus (20) is described with reference to FIG. 3. When performing the humidification/heating operation, the rotating speed of the adsorption rotor (24) is set at 20 rpm. A first air stream in a state of Point A is fed into the first passage (21) of the humidity controller apparatus (20). The first air stream is sent to the adsorption rotor (24). In the adsorption rotor (24), the first air stream comes into contact with the absorbent. As the adsorption rotor (24) gathers speed, the time that the portion of the adsorption rotor (24) heated by the second air stream is in contact with the first air stream becomes shorter. Consequently, the temperature of the portion of the adsorption rotor (24) that extends across the first passage (21) is held at a relatively high level. Therefore, in the first passage (21), the difference in temperature between the adsorption rotor (24) and the first air stream widens, thereby increasing the amount of heat which is applied to the first air stream from the adsorption rotor (24).

In addition, since in the state of Point A the absolute humidity of the first air stream is considerably low, some moisture is desorbed from the adsorbent of the adsorption rotor (24). The desorbed moisture is given to the first air stream. The first air stream increases in absolute humidity and temperature, thereby entering a state of Point B. The first air stream in the state of Point B is supplied, as supply air (SA), to the inside of the room.

Meanwhile, a second air stream in a state of Point C is fed into the second passage (22) of the humidity controller apparatus (20). The second air stream is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point D.

The second air stream in the state of Point D is sent to the adsorption rotor (24). In the adsorption rotor (24), the second air stream comes into contact with the adsorbent. At this time, the heated second air stream gives off heat to the adsorption rotor (24). In addition, some of the moisture present in the second air stream is adsorbed on the adsorbent of the adsorption rotor (24). Consequently, the second air stream decreases in absolute humidity and temperature, thereby entering a state of Point E. The second air stream in the state of Point E is discharged, as exhaust air (EA), to the outside of the room.

In each of the dehumidification and humidification/heating operations, the portion of the adsorption rotor (24) extending across the second passage (22) is heated by the second air stream. The temperature of the portions of the adsorption rotor (24) is distributed as follows. In the adsorption rotor (24), an area that stays in contact with the second air stream for a longer period of time, i.e., an area located nearer to the terminal end in the rotating direction of the adsorption rotor (24) has a higher temperature. In other words, a temperature distribution is formed in the adsorption rotor (24) so that the temperature increases from the leading end towards the terminal end of the second passage (22) in the rotating direction of the adsorption rotor (24).

Figure 4:
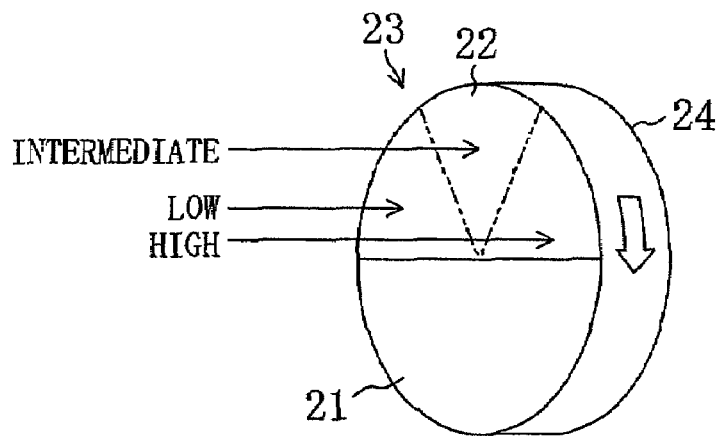
FIG. 4 is an illustration showing the temperature distribution of a second air stream flowing into a humidity control part in the humidity controller apparatus of the first embodiment.

Therefore, as shown in FIGS. 1 and 4, the heater (25) heats a second air stream so as to form a corresponding temperature distribution to the temperature distribution of the adsorption rotor (24). In other words, the second air stream flowing into the humidity control part (23) has a temperature distribution allowing the temperature to be higher in an area located nearer to the terminal end of the second passage (22) in the rotating direction of the adsorption rotor (24), in other word, the temperature is lower in an area located nearer to the leading end of the second passage (22) in the rotating direction of the adsorption rotor (24).

Thereby, in the adsorption rotor (24), a low-temperature portion of the second air stream comes into contact with a relatively low-temperature area of the portion of the adsorption rotor (24) that extends across the second passage (22) (i.e., an area at the leasing end side) while, on the other hand, a high-temperature portion of the second air stream comes into contact with a relatively high-temperature area of the portion of the adsorption rotor (24) that extends across the second passage (22) (i.e., an area at the terminal end side). Consequently, the difference in temperature between the second air stream flowing into the adsorption rotor (24) and the adsorption rotor (24) is uniformized.

Effects of Embodiment 1

In the humidity controller apparatus (20) of the present embodiment, switching between the dehumidification operation and the humidification/heating operation is made by adjustment to the amount of heat exchange and the amount of moisture exchange in the humidity control part (23). This makes it possible for the humidity controller apparatus (20) to switch between the dehumidification operation and the humidification/heating operation without switching the distribution route of the first and second air streams. Therefore, the present embodiment provides a humidity controller apparatus which is able to switch between the dehumidification operation and the humidification/heating operation, which is simple in configuration, and which is highly reliable. Especially, the amount of heat exchange and the amount of moisture exchange are reliably controlled by varying the rotating speed of the adsorption rotor (24) disposed in the humidity control part (23).

In addition, in the humidity controller apparatus (20) of the present embodiment, the heater (25) forms a temperature distribution in a second air stream so that an area of the adsorption rotor (24) having a higher temperature comes into contact with a high-temperature portion of the second air stream. This makes it possible to make the difference in temperature between the adsorption rotor (24) and the second air stream which heats the adsorption rotor (24) approximately constant, and heating of the adsorption rotor (24) is carried out with high efficiency. Therefore, in accordance with the present embodiment, the amount of heating to the second air stream necessary for regeneration of the adsorption rotor (24) is cut down.

Embodiment 2 of Invention

A second embodiment of the present invention is a modification of the first embodiment, in other words the second embodiment provides a humidity controller apparatus (20) having a different configuration from the counterpart of the first embodiment. Here, with respect to the present embodiment, the differences from first embodiment are described below.

Figure 5:
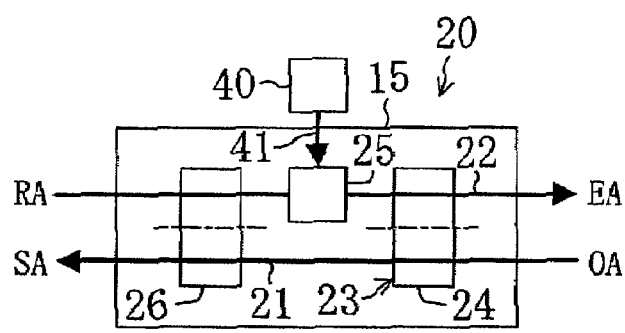
FIG. 5 is a schematic showing the arrangement of a humidity controller apparatus of a second embodiment of the present invention.

As shown in FIG. 5, the humidity controller apparatus (20) of the present embodiment includes a rotating rotor (26) as a sensible heat exchanger. The rotating rotor (26) is shaped like a disc-like, honeycomb-like shape, thereby allowing the passage of air therethrough in the thickness direction.

The rotating rotor (26) is disposed so as to extend over a portion of the first passage (21) located downstream of the humidity control part (23) and a portion of the second passage (22) located upstream of the heater (25). In addition, the rotating rotor (26) is disposed, such that it is oriented so as to extend across the first and second passages (21) and (22). Stated another way, one part of the rotating rotor (26) comes into contact with a first air stream flowing through the first passage (21) while the rest comes into contact with a second air stream flowing through the second passage (22). And, when the rotating rotor (26) is rotationally driven by a motor (not shown), heat exchange takes place between the first air stream and the second air stream.

Running Operation

The running operation of the humidity controller apparatus (20) is described below.

Figure 6:
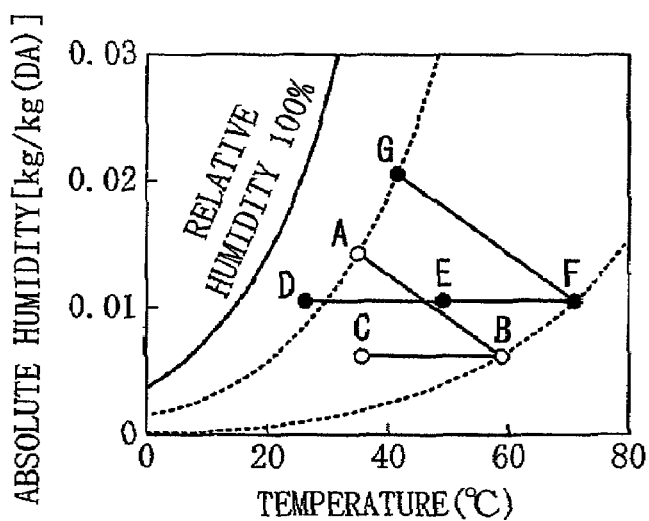
FIG. 6 is a psychrometric chart representing a dehumidification operation of the humidity controller apparatus of the second embodiment.

In the first place, a dehumidification operation of the humidity controller apparatus (20) is described with reference to FIG. 6. When performing the dehumidification operation, the rotating speed of the adsorption rotor (24) is set at 0.5 rpm. A first air stream in a state of Point A is fed into the first passage (21) of the humidity controller apparatus (20). Then, the first air stream is sent to the adsorption rotor (24). In the adsorption rotor (24), moisture present in the first air stream is adsorbed on the adsorbent. Thereby, the first air stream varies along an isenthalpic curve. The first air stream decreases in absolute humidity but rises in temperature, thereby entering a state of Point B. The first air stream in the state of Point B is sent to the rotating rotor (26). During the passage through the rotating rotor (26), the first air stream gives off heat to the rotating rotor (26). Consequently, the temperature of the first air stream falls, thereby entering a state of Point C. The first air stream in the state of Point C is supplied, as supply air (SA), to the inside of the room.

Meanwhile, a second air stream in a state of Point D is fed into the second passage (22) of the humidity controller apparatus (20). The second air stream is sent to the rotating rotor (26). Meanwhile, in due time, a portion of the rotating rotor (26) that has absorbed the heat from the first air stream moves to the second passage (22) and comes into contact with the second air stream because the rotating rotor (26) is rotating. In the rotating rotor (26), the heat collected from the first air stream is applied to the second air stream. Consequently, the second air stream rises in temperature, thereby entering a state of Point E. The second air stream in the state of Point E is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point F.

The second air stream in the state of Point F is sent to the adsorption rotor (24). In the adsorption rotor (24), the second air stream comes into contact with the adsorbent. By contact with the second air stream, moisture is desorbed from the adsorbent of the adsorption rotor (24) and as a result the adsorbent is regenerated. This causes the second air stream to vary along an isenthalpic curve. The second air stream rises in absolute humidity but drops in temperature, thereby entering a state of Point G The second air stream in the state of Point G is discharged, as exhaust air (EA), to the outside of the room.

Next, a humidification/heating operation of the humidity controller apparatus (20) is described. When performing the humidification/heating operation, the rotating speed of the adsorption rotor (24) is set at 20 rpm. In addition, the rotating rotor (26) is in the stopped state. In other words, the first and second air streams flow through the adsorption rotor (24) at rest, which means no heat exchange takes place between the first and second air streams. And, in the humidification/heating operation of the humidity controller apparatus (20) of the present embodiment, the same operations as in the humidification/heating operation of the humidity controller apparatus (20) of the first embodiment are performed (see FIG. 3).

Embodiment 3 of Invention

A third embodiment of the present invention is a modification of the first embodiment, in other words the third embodiment provides a humidity controller apparatus (20) having a different configuration from the counterpart of the first embodiment. Here, with respect to the present embodiment, the differences from the first embodiment are described below.

Figure 7:
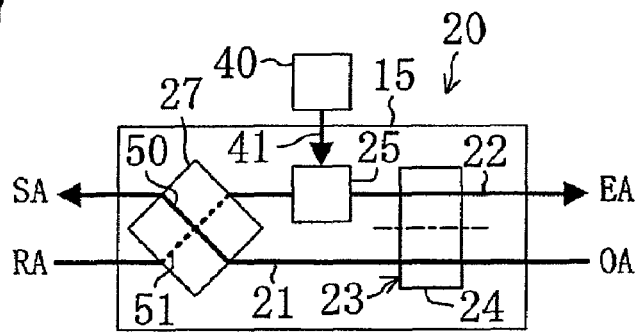
FIG. 7 is a schematic showing the arrangement of a humidity controller apparatus of a third embodiment of the present invention.

As shown in FIG. 7, the humidity controller apparatus (20) of the present embodiment includes, as a sensible heat exchanger, a heat exchange member (27). The heat exchange member (27) is shaped like a rectangular parallelepiped, wherein a first flow path (51) as a flow path along which the first air stream flows and a second flow path (52) as a flow path along which the second air stream flows are alternately arranged in the heightwise direction of the heat exchange member (27), i.e., in the direction perpendicular to the paper in FIG. 7. The first flow path (51) of the heat exchange member (27) is connected to a portion of the first passage (21) located downstream of the humidity control part (23) while, on the other hand, the second flow path (52) of the heat exchange member (27) is connected to a portion of the second passage (22) located upstream of the heater (25). And, in the heat exchange member (27), heat exchange takes place between the first air stream flowing through the first flow path (51) and the second air stream flowing through the second flow path (52).

Running Operation

The running operation of the humidity controller apparatus (20) is described below.

In the first place, a dehumidification operation of the humidity controller apparatus (20) is described. When performing the dehumidification operation, the rotating speed of the adsorption rotor (24) is set at 0.5 rpm. And, in the dehumidification operation, the same operations as in the dehumidification operation of the humidity controller apparatus (20) of the second embodiment are performed (see FIG. 6). Stated another way, following dehumidification by the adsorption rotor (24), the first air stream is cooled in the heat exchange member (27) and then is supplied to the inside of the room. On the other hand, following preheating by the heat exchange member (27), the second air stream is heated by the heater (25) and sequentially is used to regenerate the adsorption rotor (24). Thereafter, the second air stream is discharged to the outside of the room.

Figure 8:
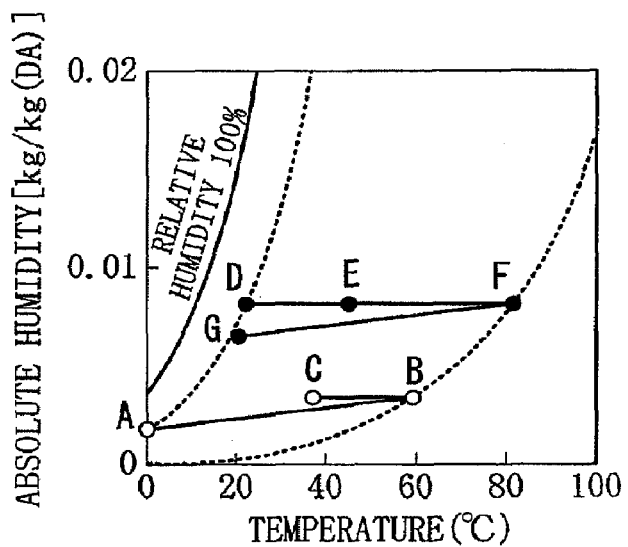
FIG. 8 is a psychrometric chart representing a humidification/heating operation of the humidity controller apparatus of the third embodiment.

Next, a humidification/heating operation of the humidity controller apparatus (20) is described with reference to FIG. 8. When performing the humidification/heating operation, the rotating speed of the adsorption rotor (24) is set at 20 rpm. A first air stream in a state of Point A is fed into the first passage (21) of the humidity controller apparatus (20). The first air stream is sent to the adsorption rotor (24). In the adsorption rotor (24), the first air stream receives heat from the adsorption rotor (24). In addition, since in the state of Point A the absolute humidity of the first air stream is low, moisture is desorbed from the adsorbent and then given to the first air stream. As a result, the first air stream increases in absolute humidity and temperature, thereby entering a state of Point B. The first air stream in the state of Point B is sent to the heat exchange member (27). In the heat exchange member (27), the first air stream exchanges heat with the second air. Consequently, the first air stream falls in temperature, thereby entering a state of Point C. The first air stream in the state of Point C is supplied, as supply air (SA), to the inside of the room.

Meanwhile, a second air stream in a state of Point D is fed into the second passage (22) of the humidity controller apparatus (20). The second air stream is sent to the heat exchange member (27). In the heat exchange member (27), the second air stream exchanges heat with the first air stream. Consequently, the second air stream rises in temperature, thereby entering a state of Point E. The second air stream in the state of Point E is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point F.

The second air stream in the state of Point F is sent to the adsorption rotor (24). In the adsorption rotor (24), the second air stream gives off heat to the adsorption rotor (24). In addition, moisture present in the second air stream is adsorbed on the adsorbent. Consequently, the second air stream falls in absolute humidity and temperature, thereby entering a state of Point G The second air stream in the state of Point G is discharged, as exhaust air (EA), to the outside of the room.

Variation of Embodiment 3

Figure 9:
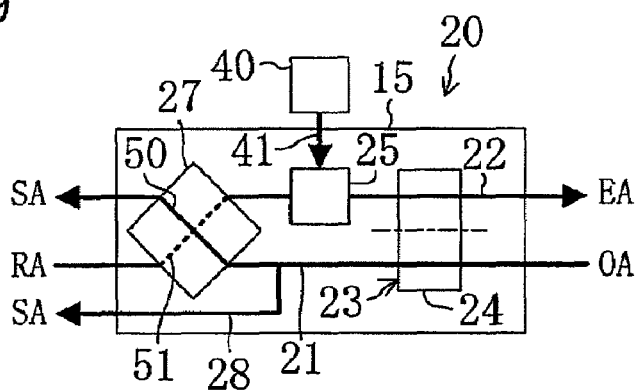
FIG. 9 is a schematic showing the arrangement of a variation of the humidity controller apparatus of the third embodiment.

As shown in FIG. 9, the humidity controller apparatus (20) of the third embodiment may be modified such that a bypass passage (28) for directing a first air stream flowing through the first passage (21) to the inside of the room is provided between the downstream side of the humidity control part (23) and the heat exchange member (27) in the first passage (21). For example, in the intermediate stage that outside air (OA) has a higher temperature than room air (RA), room cooling can be provided by directing a first air stream to the inside of the room through the first passage (21) and then through the bypass passage (28), with the heater (25) and the adsorption rotor (24) placed in the stopped state. In other words, in the humidity controller apparatus (20) of the present variation, room cooling is provided with less power consumption.

Embodiment 4 of Invention

A fourth embodiment of the present invention is a modification of the second embodiment, in other words the fourth embodiment includes a heating means (25) having a different configuration from the counterpart of the second embodiment. Here, with respect to the present embodiment, the differences from the second embodiment are described below.

Figure 10:
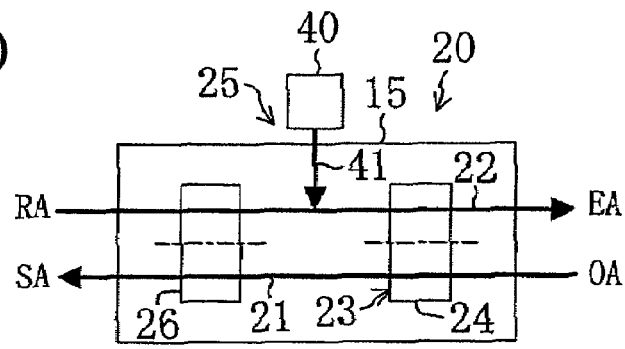
FIG. 10 is a schematic showing the arrangement of a humidity controller apparatus of a fourth embodiment of the present invention.

As shown in FIG. 10, the humidity controller apparatus (20) of the present embodiment includes an exhaust gas pipe (41) of the co-generation system (40) which is an electric power generator. The exhaust gas pipe (41) is connected between the rotating rotor (26) and the humidity control part (23) in the second passage (22).

In the co-generation system (40), an exhaust gas emitted from the solid-electrolyte fuel cell has a higher absolute humidity and a higher temperature than the second air stream. The exhaust gas is sent, as a gas for heating the second air stream, to the exhaust gas pipe (41). And, the heating means (25) of the present embodiment heats the second air stream by mixing the exhaust gas supplied from the exhaust gas pipe (41) into the second air stream flowing through the second passage (22).

In addition, the heating means (25) supplies, to a plurality of areas in the second passage (22), the exhaust gas at different flow rates so that a predetermined temperature distribution is formed in the second air stream flowing into the humidity control part (23). That is to say, in a cross section of the second passage (22), an area located nearer to the leading end in the rotating direction of the adsorption rotor (24) is supplied with a less amount of exhaust gas while, on the other hand, an area located nearer to the terminal end in the rotating direction of the adsorption rotor (24) is supplied with a greater amount of exhaust gas.

Running Operation

The running operation of the humidity controller apparatus (2.0) is described below.

Figure 11:
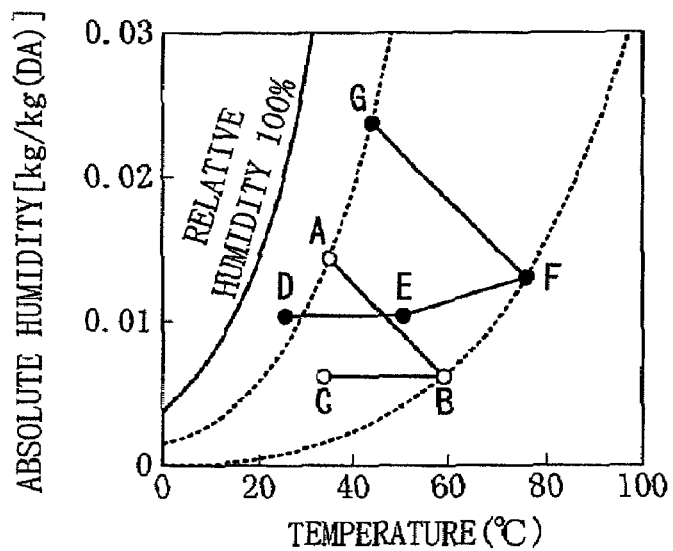
FIG. 11 is a psychrometric chart representing a dehumidification operation of the humidity controller apparatus of the fourth embodiment.

In the first place, a dehumidification operation of the humidity controller apparatus (20) is described with reference to FIG. 11. When performing the dehumidification operation, the rotating speed of the adsorption rotor (24) is set at 0.5 rpm. A first air stream in a state of Point A is fed into the first passage (21) of the humidity controller apparatus (20). The first air stream is sent to the adsorption rotor (24). In the adsorption rotor (24), moisture present in the first air stream is adsorbed on the adsorbent. Thereby, the first air stream varies along an isenthalpic curve. The first air stream falls in absolute humidity but rises in temperature, thereby entering a state of Point B. The first air stream in the state of Point B is sent to the rotating rotor (26). During the passage through the rotating rotor (26), the first air stream gives off heat to the rotating rotor (26). Consequently, the first air stream falls in temperature, thereby entering a state of Point C. The first air stream in the state of Point C is supplied, as supply air (SA), to the inside of the room.

Meanwhile, a second air stream in a state of Point D is fed into the second passage (22) of the humidity controller apparatus (20). The second air stream is sent to the rotating rotor (26). In the rotating rotor (26), heat collected from the first air stream is applied to the second air stream. Consequently, the second air stream rises in temperature, thereby entering a state of Point E. The exhaust gas of the co-generation system (40) is mixed into the second air stream in the state of Point E. And, the second air stream rises in absolute humidity and temperature, thereby entering a state of Point F.

The second air stream in the state of Point F is sent to the adsorption rotor (24). In the adsorption rotor (24), the second air stream comes into contact with the adsorbent. By contact with the second air stream, moisture is desorbed from the adsorbent of the adsorption rotor (24) and as a result the adsorbent is regenerated. Thereby, the second air stream varies along an isenthalpic curve. The second air stream rises in absolute humidity but falls in temperature, thereby entering a state of Point G. The second air stream in the state of Point G is discharged, as exhaust air (EA), to the outside of the room.

Figure 12:
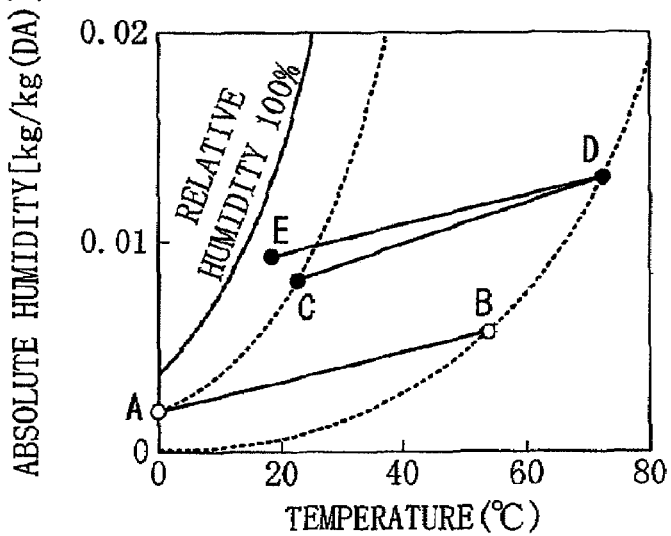
FIG. 12 is a psychrometric chart representing a humidification/heating operation of the humidity controller apparatus of the fourth embodiment.

Next, a humidification/heating operation of the humidity controller apparatus (20) is described with reference to FIG. 12. When performing the humidification/heating operation, the rotating speed of the adsorption rotor (24) is set at 20 rpm. In addition, the rotating rotor (26) is in the stopped state. A first air stream in a state of Point A is fed into the first passage (21) of the humidity controller apparatus (20). The first air stream is sent to the adsorption rotor (24). In the adsorption rotor (24), the first air stream receives heat from the adsorption rotor (24). In addition, since in the state of Point A the absolute humidity of the first air stream is low, moisture is desorbed from the adsorbent and then given to the first air stream. As a result, the first air stream rises in absolute humidity and temperature, thereby entering a state of Point B. The first air stream in the state of Point B is supplied, as supply air (SA), to the inside of the room.

Meanwhile, a second air stream in a state of Point C is fed into the second passage (22) of the humidity controller apparatus (20). The exhaust gas of the co-generation system (40) is mixed into the second air stream. As a result, the second air stream rises in absolute humidity and temperature, thereby entering a state of Point D. The second air stream in the state of Point D is sent to the adsorption rotor (24). In the adsorption rotor (24), the second air stream gives off heat to the adsorption rotor (24). In addition, moisture present in the second air stream is adsorbed on the adsorbent. Thereby, the second air stream falls in absolute humidity and temperature, thereby entering a state of Point E. The second air stream in the state of Point E is discharged, as exhaust air (EA), to the outside of the room.

In the humidity controller apparatus (20) of the present embodiment, the exhaust gas of the co-generation system (40) is mixed into the second air stream. Thereby, the second air stream rises not only in temperature but also in absolute humidity. Consequently, the second air stream having a higher temperature and a higher absolute humidity is supplied to the humidity control part (23). And, in the humidification/heating operation, the heat and the moisture held in the second air stream are given to the first air stream through the adsorption rotor (24). Accordingly, in the humidity controller apparatus (20) of the present embodiment, the first air stream which is supplied to the inside of the room can be increased not only in temperature but also in absolute humidity. In other words, the amount of humidification to the first air stream is increased.

Embodiment 5 of Invention

A fifth embodiment of the present invention is a modification of the fourth embodiment, in other words the fifth embodiment provides a humidity controller apparatus (20) having a different configuration from the counterpart of the fourth embodiment. Here, with respect to the present embodiment, the differences from the fourth embodiment are described below.

Figure 13:
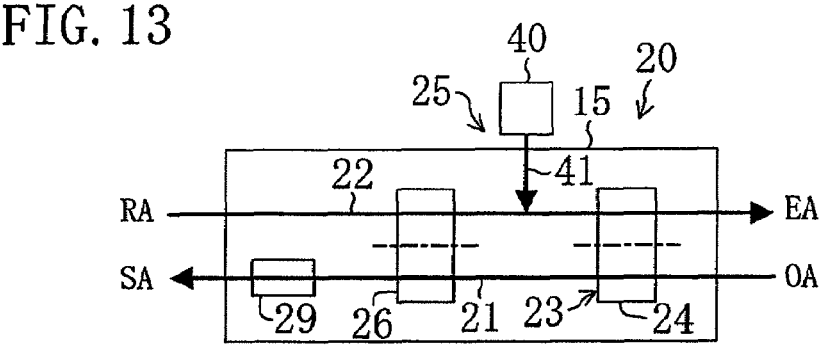
FIG. 13 is a schematic showing the arrangement of a humidity controller apparatus of a fifth embodiment of the present invention.

As shown in FIG. 13, the humidity controller apparatus (20) of the present embodiment includes a humidifier (29). The humidifier (29) is provided to humidify the first air stream. The humidifier (29) is disposed downstream of the humidity control part (23) in the first passage (21). The humidifier (29) is supplied with tap water or the like. And, the humidifier (29) humidifies the first air stream by dispersing it with tap water supplied thereto.

Running Operation

The running operation of the humidity controller apparatus (20) is described below.

Figure 14:
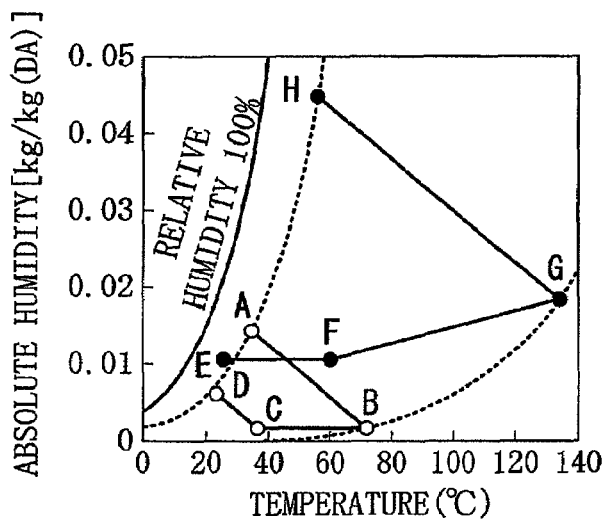
FIG. 14 is a psychrometric chart representing a dehumidification operation of the humidity controller apparatus of the fifth embodiment.

In the first place, a dehumidification operation of the humidity controller apparatus (20) is described with reference to FIG. 14. When performing the dehumidification operation, the rotating speed of the adsorption rotor (24) is set at 0.5 rpm. A first air stream in a state of Point A is fed into the first passage (21) of the humidity controller apparatus (20). The first air stream is sent to the adsorption rotor (24). In the adsorption rotor (24), moisture present in the first air stream is adsorbed on the adsorbent. Consequently, the first air stream varies along an isenthalpic curve. The first air stream falls in absolute humidity but rises in temperature, thereby entering a state of Point B.

The first air in the state of Point B is sent to the rotating rotor (26). During the passage through the rotating rotor (26), the first air stream gives off heat to the rotating rotor (26). Consequently, the first air stream falls in temperature, thereby entering a state of Point C. The first air stream in the state of Point C is sent to the humidifier (29) where the first air stream is humidified. At that time, in the first air stream, the supplied water absorbs heat and evaporates. Consequently, the first air stream rises in absolute humidity but falls in temperature, thereby entering a state of Point D. The first air stream in the state of Point D is supplied, as supply air (SA), to the inside of the room.

Meanwhile, a second air stream in a state of Point E is fed into the second passage (22) of the humidity controller apparatus (20). The second air stream is sent to the rotating rotor (26). In the rotating rotor (26), heat collected from the first air stream is applied to the second air stream. Consequently, the second air stream rises in temperature, thereby entering a state of Point F. The exhaust gas of the co-generation system (40) is mixed into the second air stream in the state of Point F. As a result, the second air stream rises in absolute humidity and temperature, thereby entering a state of Point G.

The second air stream in the state of Point G is sent to the adsorption rotor (24). In the adsorption rotor (24), the second air stream comes into contact with the adsorbent. By such contact with the second air stream, moisture is desorbed from the adsorbent of the adsorption rotor (24), and the adsorbent is regenerated. Thereby, the second air stream varies along an isenthalpic curve. The second air stream rises in absolute humidity but falls in temperature, thereby entering a state of Point H. The second air stream in the state of Point H is discharged, as exhaust air (EA), to the outside of the room.

Figure 15:
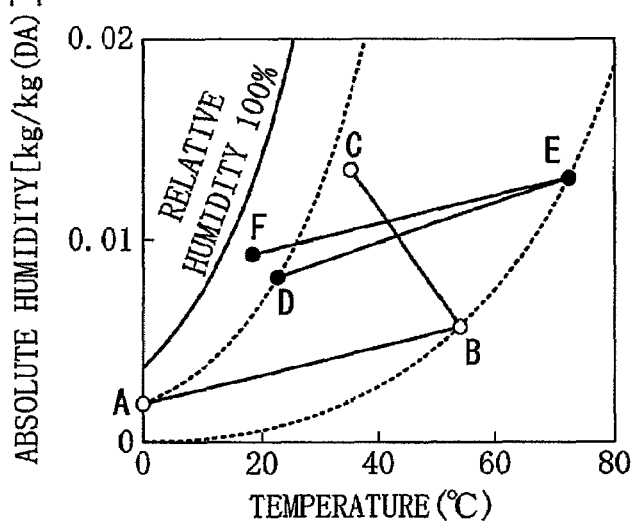
FIG. 15 is a psychrometric chart representing a humidification/heating operation of the humidity controller apparatus of the fifth embodiment.

Next, a humidification/heating operation of the humidity controller apparatus (20) is described with reference to FIG. 15. When performing the humidification/heating operation, the rotating speed of the adsorption rotor (24) is set at 20 rpm. In addition, the rotating rotor (26) is in the stopped state. A first air stream in a state of Point A is fed into the first passage (21) of the humidity controller apparatus (20). The first air stream is sent to the adsorption rotor (24). In the adsorption rotor (24), the first air stream receives heat from the adsorption rotor (24). In addition, since in the state of Point A the absolute humidity of the first air stream is low, moisture is desorbed from the adsorbent and then given to the first air stream. The first air stream rises in absolute humidity and temperature, thereby entering a state of Point B.

The first air stream in the state of Point B is sent to the humidifier (29) where the first air stream is humidified. At that time, in the first air stream, the supplied water absorbs heat and evaporates. Consequently, the first air stream rises in absolute humidity but falls in temperature, thereby entering a state of Point C. The first air stream in the state of Point C is supplied, as supply air (SA), to the inside of the room.

Meanwhile, a second air stream in a state of Point D is fed into the second passage (22) of the humidity controller apparatus (20). The exhaust gas of the co-generation system (40) is mixed into the second air stream. Consequently, the second air stream rises in absolute humidity and temperature, thereby entering a state of Point E. The second air stream in the state of Point E is sent to the adsorption rotor (24). In the adsorption rotor (24), the second air stream gives off heat to the adsorption rotor (24). In addition, moisture present in the second air stream is adsorbed on the adsorbent. Thereby, the second air stream falls in absolute humidity and temperature, thereby entering a state of Point F. The second air stream in the state of Point F is discharged, as exhaust air (EA), to the outside of the room.

Variation of Embodiments 5

Figure 16:
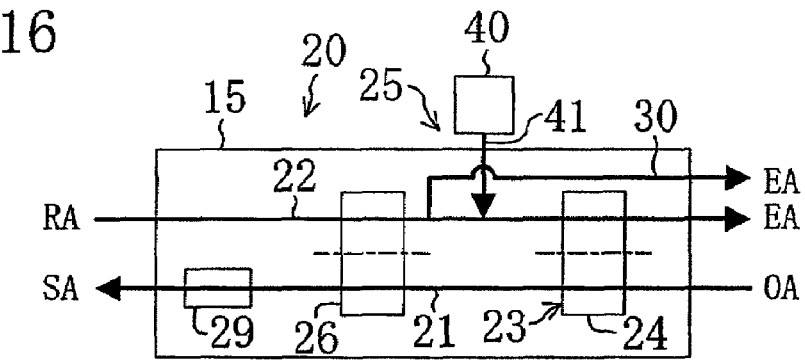
FIG. 16 is a schematic showing the arrangement of a variation of the humidity controller apparatus of the fifth embodiment.

As shown in FIG. 16, the humidity controller apparatus (20) of the fifth embodiment may be modified such that the second passage (22) has an exhaust passage (30) for discharging a portion of the second air stream after passage through the rotating rotor (26) but before subjected to heating by the heating means (25), to the outside of the room. A portion of the second air stream is discharged from the exhaust passage (30), as a result of which the flow rate of the second air stream which is heated by the heating means (25) decreases and the temperature of the second air stream after heating rises. Consequently, the second air stream having a higher temperature is supplied to the humidity control part (23), and the amount of moisture which is desorbed from the adsorbent increases. As a result, the amount of moisture that the adsorbent of the adsorption rotor (24) after movement to the first passage (21) adsorbs also increases.

Accordingly, in the humidity controller apparatus (20) of the present variation, the amount of moisture present in the first air stream which is adsorbed on the adsorbent of the adsorption rotor (24) increases, and during the dehumidification operation the humidity of the first air stream which is supplied to the inside of the room is decreased to a further extent. In addition, in the humidity controller apparatus (20) of the present variation, the exhaust passage (30) is located downstream of the rotating rotor (26) in the second passage (22). As a result of such arrangement, the flow rate of the second air stream flowing into the rotating rotor (26) is secured, thereby ensuring that the first air stream is cooled in the rotating rotor (26).

Embodiment 6 of Invention

A sixth embodiment of the present invention is a modification of the first embodiment, in other words the sixth embodiment provides a humidity controller apparatus (20) having a different configuration from the counterpart of the first embodiment. Here, with respect to the present embodiment, the differences from the first embodiment are described below.

Figure 17:
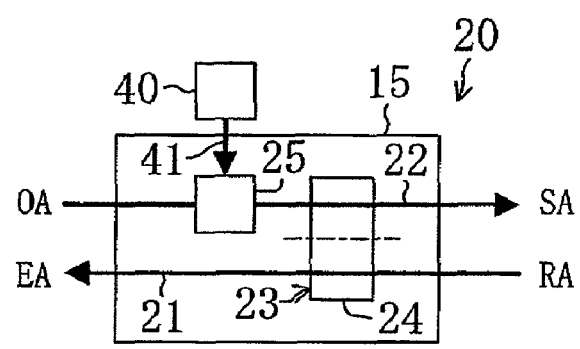
FIG. 17 is a schematic showing the arrangement of a humidity controller apparatus of a sixth embodiment of the present invention.

As shown in FIG. 17, in the humidity controller apparatus (20) of the present embodiment, the leading end of the first passage (21) is connected to the inside of a room while the terminal end thereof is connected to the outside of the room. In addition, the leading end of the second passage (22) is connected to the outside of the room while the terminal end thereof is connected to the inside of the room. Room air (RA) is fed, as a first air stream, into the first passage (21). Outside air (OA) is fed, as a second air stream, into the second passage (22). In other words, in the humidity controller apparatus (20) of the present invention according to the humidity controller apparatus (20) of the first embodiment, the connection destination of the first and second passages (21) and (22) is changed for switching between air streams respectively taken into the first and second passages (21) and (22).

Running Operation

The running operation of the humidity controller apparatus (20) is described below.

Figure 18:
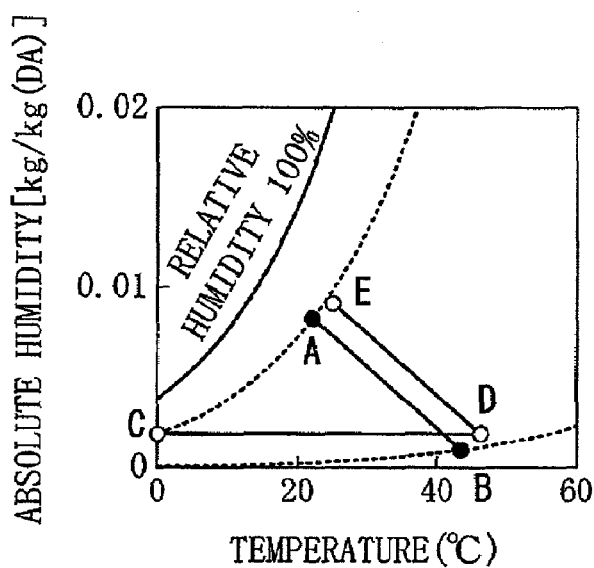
FIG. 18 is a psychrometric chart representing a humidification operation of the humidity controller apparatus of the sixth embodiment.

In the first place, a humidification operation of the humidity controller apparatus (20) is described with reference to FIG. 18. When performing the humidification operation, the rotating speed of the adsorption rotor (24) is set at 0.5 rpm. A first air stream in a state of Point A is fed into the first passage (21) of the humidity controller apparatus (20). The first air stream is sent to the adsorption rotor (24). In the adsorption rotor (24), moisture present in the first air stream is adsorbed on the adsorbent. Thereby, the first air stream varies along an isenthalpic curve. The first air stream falls in absolute humidity but rises in temperature, thereby entering a state of Point B. The first air stream in the state of Point B is discharged, as exhaust air (EA), to the outside of the room.

Meanwhile, a second air stream in a state of Point C is fed into the second passage (22) of the humidity controller apparatus (20). The second air stream is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point D. The second air stream in the state of Point D is sent to the adsorption rotor (24). In the adsorption rotor (24), the second air stream comes into contact with the adsorbent. By contact with the second air stream, moisture is desorbed from the adsorbent of the adsorption rotor (24), and the adsorbent is regenerated. Thereby, the second air stream varies along an isenthalpic curve. The second air stream rises in absolute humidity but falls in temperature, thereby entering a state of Point E. The second air stream in the state of Point E is supplied, as supply air (SA), to the inside of the room.

Figure 19:
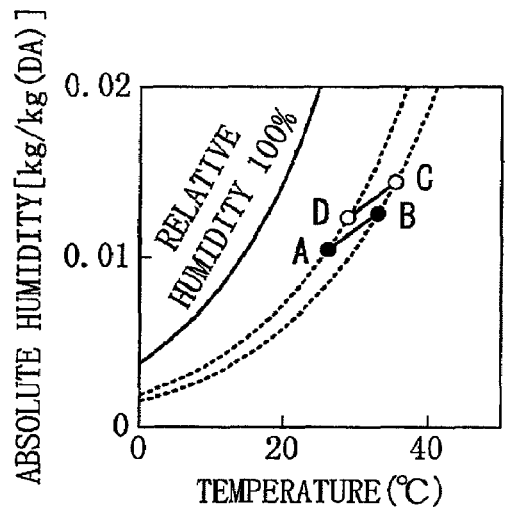
FIG. 19 is a psychrometric chart representing a dehumidification/cooling operation of the humidity controller apparatus of the sixth embodiment.

Next, a dehumidification/cooling operation of the humidity controller apparatus (20) is described with reference to FIG. 19. When performing the dehumidification/cooling operation, the rotating speed of the adsorption rotor (24) is set at 20 rpm. Heating of the second air stream by the heater (25) is being stopped. A first air stream in a state of Point A is fed into the first passage (21) of the humidity controller apparatus (20). The first air stream is sent to the adsorption rotor (24). In the adsorption rotor (24), the first air stream receives heat from the adsorption rotor (24). In addition, since in the state of Point A the absolute humidity of the first air stream is low, moisture is desorbed form the adsorbent and then given to the first air stream. Consequently, the first air stream rises in absolute humidity and temperature, thereby entering a state of Point B. The first air stream in the state of Point B is discharged, as exhaust air (EA), to the outside of the room.

Meanwhile, a second air stream in a state of Point C is fed into the second passage (22) of the humidity controller apparatus (20). The second air stream is sent to the adsorption rotor (24). In the adsorption rotor (24), the second air stream gives off heat to the adsorption rotor (24). In addition, moisture present in the second air stream is adsorbed on the adsorbent. Consequently, the second air stream falls in absolute humidity and temperature, thereby entering a state of Point D. The second air stream in the state of Point D is supplied, as supply air (SA), to the inside of the room.

The humidity controller apparatus (20) of the present embodiment provides the same effects as the first embodiment. To sum up, switching between the dehumidification/cooling operation and the humidification operation becomes possible without switching the distribution route of the first and second air streams. Therefore, the humidity controller apparatus (20) of the present embodiment is able to switch between the dehumidification/cooling operation and the humidification operation. Besides, the humidity controller apparatus (20) of the present embodiment is simple in configuration and has high reliability.

Embodiment 7 of Invention

A seventh embodiment of the present invention is a modification of the second embodiment, in other words the seventh embodiment provides a humidity controller apparatus (20) having a different configuration from the counterpart of the second embodiment. Here, with respect to the present embodiment, the differences from the second embodiment are described below.

Figure 20:
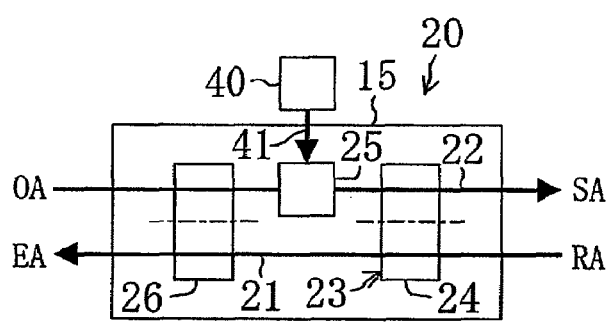
FIG. 20 is a schematic showing the arrangement of a humidity controller apparatus of a seventh embodiment of the present invention.

As shown in FIG. 20, in the humidity controller apparatus (20) of the present embodiment, the leading end of the first passage (21) is connected to the inside of a room while the terminal end thereof is connected to the outside of the room. In addition, the leading end of the second passage (22) is connected to the outside of the room while the terminal end thereof is connected to the inside of the room. Room air (RA) is fed, as a first air stream, into the first passage (21). Outside air (OA) is fed, as a second air stream, into the second passage (22). In other words, in the humidity controller apparatus (20) of the present invention according to the humidity controller apparatus (20) of the second embodiment, the connection destination of the first and second passages (21) and (22) is changed for switching between air streams respectively taken into the first and second passages (21) and (22).

Running Operation

The running operation of the humidity controller apparatus (20) of the present embodiment is described below.

Figure 21:
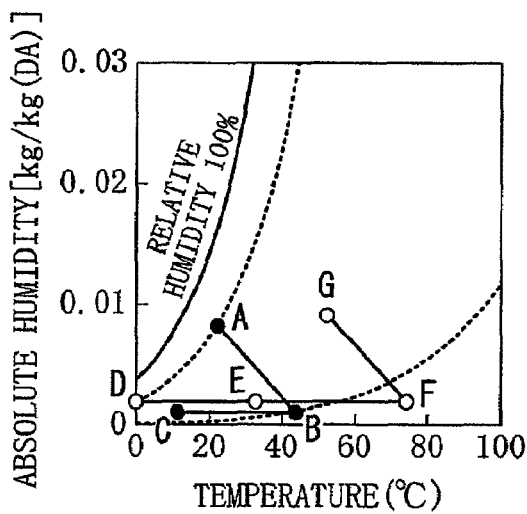
FIG. 21 is a psychrometric chart representing a humidification operation of the humidity controller apparatus of the seventh embodiment.

In the first place, a humidification operation of the humidity controller apparatus (20) is described with reference to FIG. 21. When performing the humidification operation, the rotating speed of the adsorption rotor (24) is set at 0.5 rpm. A first air stream in a state of Point A is fed into the first passage (21) of the humidity controller apparatus (20). Then, the first air stream is sent to the adsorption rotor (24). In the adsorption rotor (24), moisture present in the first air stream is adsorbed on the adsorbent. This causes the first air stream to vary along an isenthalpic curve. The first air stream falls in absolute humidity but rises in temperature, thereby entering a state of Point B. The first air stream in the state of Point B is sent to the rotating rotor (26). During the passage through the rotating rotor (26), the first air stream gives off heat to the rotating rotor (26). As the result of this, the first air stream falls in temperature, thereby entering a state of Point C. The first air stream in the state of Point C is discharged, as exhaust air (EA), to the outside of the room.

Meanwhile, a second air stream in a state of Point D is fed into the second passage (22) of the humidity controller apparatus (20). The second air stream is sent to the rotating rotor (26). In the rotating rotor (26), heat collected from the first air stream is applied to the second air stream. Thereby, the second air stream rises in temperature, thereby entering a state of Point E. The second air stream in the state of Point E is sent to the heater (25). In the heater (25), heat exchange takes place between the exhaust gas of the co-generation system (40) and the second air stream. As a result of such heat exchange with the exhaust gas, the second air stream rises in temperature, thereby entering a state of Point F.

The second air stream in the state of Point F is sent to the adsorption rotor (24). In the adsorption rotor (24), the second air stream comes into contact with the adsorbent. By contact with the second air stream, moisture is desorbed from the adsorbent of the adsorption rotor (24), and the adsorbent is regenerated. This causes the second air stream to vary along an isenthalpic curve. The second air stream rises in absolute humidity but falls in temperature, thereby entering a state of Point G. The second air stream in the state of Point G is supplied, as supply air (SA), to the inside of the room.

Figure 22:
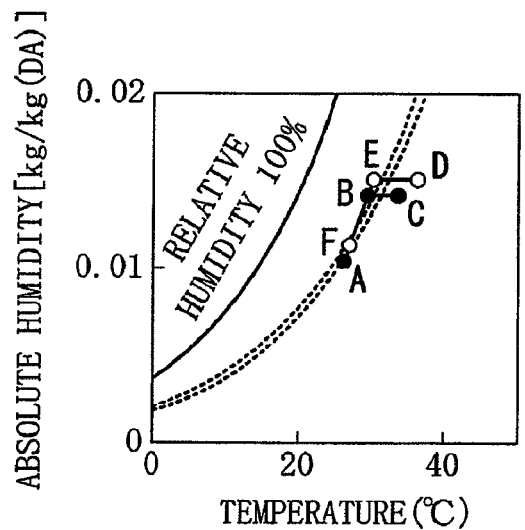
FIG. 22 is a psychrometric chart representing a dehumidification/cooling operation of the humidity controller apparatus of the seventh embodiment.

Next, a dehumidification/cooling operation of the humidity controller apparatus (20) is described with reference to FIG. 22. When performing the dehumidification/cooling operation, the rotating speed of the adsorption rotor (24) is set at 20 rpm. Heating of the second air stream by the heater (25) is stopped. A first air stream in a state of Point A is fed into the first passage (21) of the humidity controller apparatus (20). Then, the first air stream is sent to the adsorption rotor (24). In the adsorption rotor (24), the first air stream receives heat from the adsorption rotor (24). In addition, since in the state of Point A the absolute humidity of the first air stream is low, moisture is desorbed form the adsorbent and then given to the first air stream. Consequently, the first air stream rises in absolute humidity and temperature, thereby entering a state of Point B.

The first air stream in the state of Point B is sent to the rotating rotor (26). In the rotating rotor (26), heat collected from the second air stream is applied to the first air stream. Consequently, the first air stream rises in temperature, thereby entering a state of Point C. The first air stream in the state of Point C is discharged, as exhaust air (EA), to the outside of the room.

Meanwhile, a second air stream in a state of Point D is fed into the second passage (22) of the humidity controller apparatus (20). The second air stream is sent to the rotating rotor (26). During the passage through the rotating rotor (26), the second air stream gives off heat to the rotating rotor (26). Consequently, the second air stream falls in temperature, thereby entering a state of Point E. The second air stream in the state of Point E is sent to the adsorption rotor (24). In the adsorption rotor (24), the second air stream gives off heat to the adsorption rotor (24). In addition, moisture present in the second air stream is adsorbed on the adsorbent. Consequently, the second air stream falls in absolute humidity and temperature, thereby entering a state of Point F. The second air stream in the state of Point F is supplied, as supply air (SA), to the inside of the room.

Embodiment 8 of Invention

An eighth embodiment of the present invention is a modification of the third embodiment, in other words the eighth embodiment provides a humidity controller apparatus (20) having a different configuration from the counterpart of the third embodiment. Here, with respect to the present embodiment, the differences from the third embodiment are described below.

Figure 23:
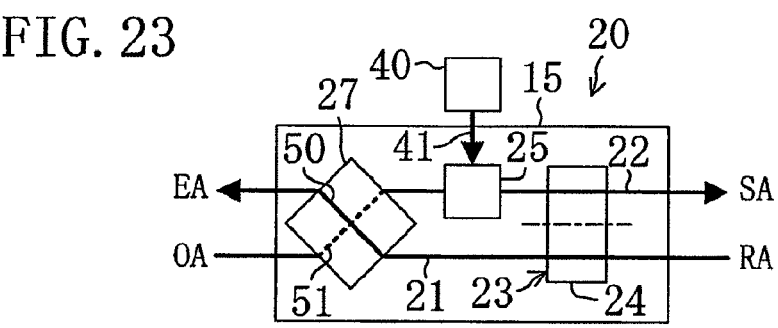
FIG. 23 is a schematic showing the arrangement of a humidity controller apparatus of an eighth embodiment of the present invention.

As shown in FIG. 23, in the humidity controller apparatus (20) of the present embodiment, the leading end of the first passage (21) is connected to the inside of a room while the terminal end thereof is connected to the outside of the room. In addition, the leading end of the second passage (22) is connected to the outside of the room while the terminal end thereof is connected to the inside of the room. Room air (RA) is fed, as a first air stream, into the first passage (21). Outside air (OA) is fed, as a second air stream, into the second passage (22). In other words, in the humidity controller apparatus (20) of the present invention according to the humidity controller apparatus (20) of the third embodiment, the connection destination of the first and second passages (21) and (22) is changed for switching between air streams respectively taken into the first and second passages (21) and (22). And, the humidity controller apparatus (20) of the present embodiment performs the same humidification and dehumidification/cooling operations that the humidity controller apparatus (20) of the seventh embodiment does.

Embodiment 9 of Invention

A ninth embodiment of the present invention is a modification of the fourth embodiment, in other words the ninth embodiment provides a humidity controller apparatus (20) having a different configuration from the counterpart of the fourth embodiment. Here, with respect to the present embodiment, the differences from the fourth embodiment are described below.

Figure 24:
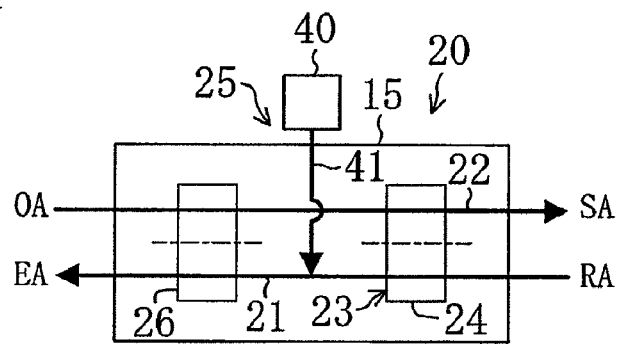
FIG. 24 is a schematic showing the arrangement of a humidity controller apparatus of a ninth embodiment of the present invention.

As shown in FIG. 24, in the humidity controller apparatus (20) of the present embodiment, the leading end of the first passage (21) is connected to the inside of a room while the terminal end thereof is connected to the outside of the room. In addition, the leading end of the second passage (22) is connected to the outside of the room while the terminal end thereof is connected to the inside of the room. Room air (RA) is fed, as a first air stream, into the first passage (21). Outside air (OA) is fed, as a second air stream, into the second passage (22). In other words, in the humidity controller apparatus (20) of the present invention according to the humidity controller apparatus (20) of the fourth embodiment, the connection destination of the first and second passages (21) and (22) is changed for switching between air streams respectively taken into the first and second passages (21) and (22).

Additionally, like the fourth embodiment, the humidity controller apparatus (20) of the present embodiment is provided with an exhaust gas pipe (41) of the co-generation system (40). However, in the humidity controller apparatus (20) of the present embodiment, the exhaust gas pipe (41) is connected, in the first passage (21), between the rotating rotor (26) and the humidity control part (23).

In the co-generation system (40), the exhaust gas emitted from the fuel cell is higher in absolute humidity and temperature than both of the first and second air streams. The exhaust gas is sent, as a gas used to heat the first air stream, to the exhaust gas pipe (41). In other words, the heating means (25) mixes the exhaust gas supplied from the exhaust gas pipe (41) into the first air stream flowing through the first passage (21), whereby the first air stream is heated. During the passage through the rotating rotor (26), the heated first air stream exchanges heat with the second air stream, as a result of which the second air stream is heated.

Running Operation

The running operation of the humidity controller apparatus (20) of the present embodiment is described below.

Figure 25:
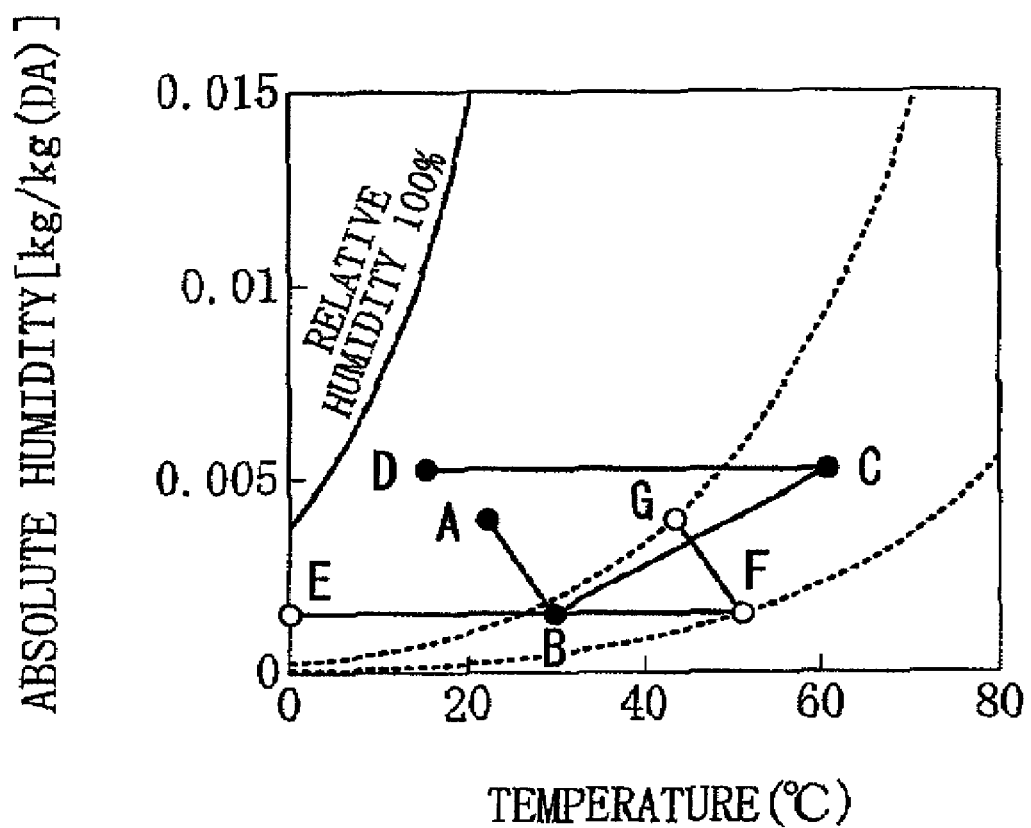
FIG. 25 is a psychrometric chart representing a humidification operation of the humidity controller apparatus of the ninth embodiment.

In the first place, a humidification operation of the humidity controller apparatus (20) is described with reference to FIG. 25. When performing the humidification operation, the rotating speed of the adsorption rotor (24) is set at 0.5 rpm. A first air stream in a state of Point A is fed into the first passage (21) of the humidity controller apparatus (20). Then, the first air stream is sent to the adsorption rotor (24). In the adsorption rotor (24), moisture present in the first air stream is adsorbed on the adsorbent. This causes the first air stream to vary along an isenthalpic curve. The first air stream falls in absolute humidity but rises in temperature, thereby entering a state of Point B.

The exhaust gas of the co-generation system (40) is mixed into the first air stream in the state of Point B. Consequently, the first air stream rises in absolute humidity and temperature, thereby entering a state of Point C. The first air stream in the state of Point C is sent to the rotating rotor (26). During the passage through the rotating rotor (26), the first air stream gives off heat to the rotating rotor (26). As a result, the first air stream falls in temperature, thereby entering a state of Point D. The first air stream in the state of Point D is discharged, as exhaust air (EA), to the outside of the room.

Meanwhile, a second air stream in a state of Point E is fed into the second passage (22) of the humidity controller apparatus (20). The second air stream is sent to the rotating rotor (26). In the rotating rotor (26), heat collected from the first air stream is applied to the second air stream. Consequently, the second air stream rises in temperature, thereby entering a state of Point F. The second air stream in the state of Point F is sent to the adsorption rotor (24). In the adsorption rotor (24), the second air stream comes into contact with the adsorbent. By contact with the second air stream, moisture is desorbed from the adsorbent of the adsorption rotor (24), and the adsorbent is regenerated. This causes the second air stream to vary along an isenthalpic curve. The second air stream rises in absolute humidity but falls in temperature, thereby entering a state of Point G. The second air stream in the state of Point G is supplied, as supply air (SA), to the inside of the room.

Next, a dehumidification/cooling operation of the humidity controller apparatus (20) is described. When performing the dehumidification/cooling operation, the rotating speed of the adsorption rotor (24) is set at 20 rpm. Heating of the first air stream by the heater (25) is stopped. And, in the dehumidification/cooling operation of the humidity controller apparatus (20) of the present embodiment, the same operations as in the dehumidification/cooling operation of the humidity controller apparatus (20) of the seventh embodiment are performed (see FIG. 21). In other words, the first air stream, after used to regenerate the adsorption rotor (24), is heated by the heat exchange member (27) and then is discharged to the outside of the room. On the other hand, the second air stream, after cooled by the heat exchange member (27), is dehumidified by the adsorption rotor (24) and then is supplied to the inside of the room.

Variation of Embodiment 9

A humidifier (29) for humidifying a second air stream may be disposed downstream of the humidity control part (23) in the second passage (22) in the humidity controller apparatus (20) of the ninth embodiment. A supply of tap water or the like is provided to the humidifier (29). And, the humidifier (29) disperses the supplied tap water to the second air stream, whereby the second air stream is humidified.

In the dehumidification/cooling operation, the humidifier (29) humidifies the second air stream. As a result, the second air stream, the temperature of which has further been lowered, is supplied to the inside of the room. In addition, in the humidification operation, the humidifier (29) humidifies the second air stream. As a result, the second air stream, the absolute humidity of which has further been risen, is supplied to the inside of the room.

INDUSTRIAL APPLICABILITY

As has been described above, the present invention is usefully applicable to humidity controller apparatuses for providing room dehumidification or humidification.

What is claimed is:

1. A humidity controller apparatus which is selectively switchable between a dehumidification operation for dehumidifying a supply of air to a room, and a humidification/heating operation for humidifying and heating a supply of air to the room, the humidity controller apparatus comprising:

a first passage through which a first air stream of an outside air flows towards the inside of the room;

a second passage through which a second air stream of a room air flows towards the outside of the room;

a humidity control part, provided with an adsorbent which is contactable with the first and second air streams, for causing heat exchange and moisture exchange between the first and second air streams, the humidity control part being configured such that the amount of heat exchange between the first and second air streams and the amount of moisture exchange between the first and second air streams are adjustable; and heating means for heating the second air stream which is sent to the humidity control part;

wherein the humidity control part, provided with a rotationally-driven adsorption rotor which has a surface on which an adsorbent is supported and which is disposed so as to extend over both the first passage and the second passage, is configured such that the amount of heat exchange and the amount of moisture exchange are adjusted by making changes in the rotational speed of the adsorption rotor, an operation for rotating the adsorption rotor while heating the second air stream is performed as a dehumidification operation in a state where the outside air to be supplied to the first air passage is higher in temperature and absolute humidity than the room air to be supplied to the second air passage, and an operation for rotating the adsorption rotor at a higher temperature than that during the dehumidification operation while heating the second air stream by the heating means is performed as a humidification/heating operation in a state where the outside air to be supplied to the first air passage is lower in temperature and absolute humidity than the room air to be supplied to the second air passage.

2. The humidity controller apparatus of claim 1, wherein: the heating means heats the second air stream to form a temperature distribution therein so that, in the adsorption rotor extending across the second passage, a terminal end portion of the adsorption rotor in the rotating direction of the adsorption rotor comes into contact with a part of the second air stream having a higher temperature than a part of the second air stream which a leading end portion of the adsorption rotor comes into contact with.

3. The humidity controller apparatus of claim 1 comprising:
a sensible heat exchanger for effecting heat exchange between the first air stream after passage through the humidity control part and the second air stream before subjected to heating by the heating means.

4. The humidity controller apparatus of claim 3 wherein:
a rotating rotor which is rotationally driven is provided as a sensible heat exchanger;
the rotating rotor being so disposed as to extend over both the first passage and the second passage; and
the rotating rotor absorbing heat from either one of the first and second air streams and then giving off the heat to the other of the first and second air streams.

5. The humidity controller apparatus of claim 4 wherein:
the rotating rotor is rotationally driven during the dehumidification operation but is stopped during the humidification/heating operation.

6. The humidity controller apparatus of claim 3 wherein:
a heat exchange member, in which flow paths for the first air stream and flow paths for the second air stream are alternately formed in a large number for mutual heat exchange between the first and second streams flowing through the respective flow paths, is provided as a sensible heat exchanger.

7. The humidity controller apparatus of claim 1 wherein:
the heating means is so configured as to heat the second air stream by mixing into the second air stream a heating gas higher in temperature and absolute humidity than the second air stream.

8. The humidity controller apparatus of claim 7 wherein:
the heating means mixes into the second air stream an exhaust gas emitted from an electric power generator as a heating gas.

9. A humidity controller apparatus which is selectively switchable between a dehumidification operation dehumidifying a supply of air to a room, and a humidification/heating operation humidifying and heating a supply of air to the room, the humidity controller apparatus comprising:

a first passage through which a first air stream of an outside air flows towards the inside of the room;

a second passage through which a second air stream of a room air flows towards the outside of the room;

a humidity control part, provided with an adsorbent which is contactable with the first and second air streams, for causing heat exchange and moisture exchange between the first and second air streams, the humidity control part being configured such that the amount of heat exchange between the first and second air streams and the amount of moisture exchange between the first and second air streams are adjustable;

heating means for heating the second air stream which is sent to the humidity control part; and a sensible heat exchanger for effecting heat exchange between the first air stream after passage through the humidity control part and the second air stream before subjected to heating by the heating means;

wherein the humidity control part, provided with a rotationally-driven adsorption rotor which has a surface on which is supported an adsorbent and which is disposed so as to extend over both the first passage and the second passage, is configured such that the amount of heat exchange and the amount of moisture exchange are adjusted by making changes in the rotational speed of the adsorption rotor, an operation for rotating the adsorption rotor while heating the second air stream is performed as a dehumidification operation in a state where the outside air to be supplied to the first air passage is higher in temperature and absolute humidity than the room air to be supplied to the second air passage, and an operation for rotating the adsorption rotor at a higher temperature than that during the dehumidification operation while heating the second air stream by the heating means is performed as a humidification/heating operation in a state where the outside air to be supplied to the first air passage is lower in temperature and absolute humidity than the room air to be supplied to the second air passage, an exhaust passage, for discharge of a portion of the second air stream after passage through the sensible heat exchanger but before subjected to heating by the heating means, is connected to the second passage.

10. A humidity controller apparatus which is selectively switchable between a dehumidification/cooling operation for dehumidifying and cooling a supply of air to a room, and a humidification operation for humidifying a supply of air to the room, the humidity controller apparatus comprising:

a first passage through which a first air stream of a room air flows towards the outside of the room;

a second passage through which a second air stream of an outside air flows towards the inside of the room;

a humidity control part, provided with an adsorbent which is contactable with the first and second air streams, for causing heat exchange and moisture exchange between the first and second air streams, the humidity control part being configured such that the amount of heat exchange between the first and second air streams and the amount of moisture exchange between the first and second air streams are adjustable; and heating means which heats the second air stream which is sent to the humidity control part during the humidification operation, and which stops heating the second air stream during the dehumidification/cooling operation;

wherein the humidity control part, provided with a rotationally-driven adsorption rotor which has a surface on which an adsorbent is supported and which is disposed so as to extend over both the first passage and the second passage, is configured such that the amount of heat exchange and the amount of moisture exchange are adjusted by making the changes in the rotational speed of the adsorption rotor;

an operation for rotating the adsorption rotor while heating the second air stream is performed as humidification operation in a state where the room air to be supplied to the first air passage is higher in temperature and absolute humidity than the outside air to be supplied to the second air passage, and an operation for rotating the adsorption rotor at a higher temperature than that during the humidification operation while stopping heating the second air stream by the heating means is performed as a dehumidification/cooling operation in a state where the room air to be supplied to the first air passage is lower in temperature and absolute humidity than the outside air to be supplied to the second air passage.

11. The humidity controller apparatus of claim 10 wherein:
the heating means heats the second air stream to form a temperature distribution therein so that, in the adsorption rotor extending across the second passage, a terminal end portion of the adsorption rotor in the rotating direction of the adsorption rotor comes into contact with a part of the second air stream having a higher temperature than a part of the second air stream which a leading end portion of the adsorption rotor comes into contact with.

12. The humidity controller apparatus of claim 10 comprising:
a sensible heat exchanger for effecting heat exchange between the first air stream after passage through the humidity control part and the second air stream before subjected to heating by the heating means.

13. The humidity controller apparatus of claim 12 wherein:
a rotating rotor which is rotationally driven is provided as a sensible heat exchanger;
the rotating rotor being so disposed as to extend over both the first passage and the second passage; and
the rotating rotor absorbing heat from either one of the first and second air streams and then giving off the heat to the other of the first and second air streams.

14. The humidity controller apparatus of claim 12 wherein:
a heat exchange member, in which flow paths for the first air stream and flow paths for the second air stream are alternately formed in a large number for mutual heat exchange between the first and second streams flowing through the respective flow paths, is provided as a sensible heat exchanger.

15. The humidity controller apparatus of claim 12 wherein:
the heating means is so configured as to heat the second air stream by heat exchange, in the sensible heat exchanger, between the first air stream heated by mixing-in of a heating gas having a higher temperature than the second air stream, and the second air stream.

16. The humidity controller apparatus of claim 15 wherein:
the heating means mixes into the first air stream an exhaust gas emitted from an electric power generator as a heating gas.

* * * * *